(12) United States Patent
Padubrin

(10) Patent No.: US 9,582,739 B2
(45) Date of Patent: Feb. 28, 2017

(54) LEARNING CONTOUR IDENTIFICATION SYSTEM USING PORTABLE CONTOUR METRICS DERIVED FROM CONTOUR MAPPINGS

(71) Applicant: Harry Friedbert Padubrin, Colorado Springs, CO (US)

(72) Inventor: Harry Friedbert Padubrin, Colorado Springs, CO (US)

(*) Notice: Subject to any disclaimer, the term of this patent is extended or adjusted under 35 U.S.C. 154(b) by 0 days.

(21) Appl. No.: 14/942,585

(22) Filed: Nov. 16, 2015

(65) Prior Publication Data
US 2016/0210534 A1    Jul. 21, 2016

Related U.S. Application Data

(60) Provisional application No. 62/081,513, filed on Nov. 18, 2014.

(51) Int. Cl.
| | |
|---|---|
| G06K 9/62 | (2006.01) |
| G06K 9/66 | (2006.01) |
| G06F 17/40 | (2006.01) |
| G06K 9/46 | (2006.01) |
| G06K 9/48 | (2006.01) |

(52) U.S. Cl.
CPC ............ G06K 9/66 (2013.01); G06F 17/40 (2013.01); G06K 9/4604 (2013.01); G06K 9/48 (2013.01); G06K 9/6204 (2013.01); G06K 9/6256 (2013.01); G06K 9/6282 (2013.01)

(58) Field of Classification Search
CPC ........ G06K 9/48; G06K 9/01; G06K 9/00026; G06K 9/00382
USPC ....... 382/156, 157, 159, 160, 170, 190, 209, 382/278, 307; 128/925; 706/15, 25
See application file for complete search history.

(56) References Cited

U.S. PATENT DOCUMENTS

| | | | | |
|---|---|---|---|---|
| 6,393,151 B1* | 5/2002 | Yamamoto | ............... | G06K 9/48 382/198 |
| 7,447,353 B2* | 11/2008 | Diederichs | .......... | B41F 33/0036 382/165 |
| 7,593,553 B2* | 9/2009 | Fujii | .................. | G06K 9/00026 382/124 |

(Continued)

*Primary Examiner* — Yosef Kassa
(74) *Attorney, Agent, or Firm* — Hanes & Bartels LLC

(57) ABSTRACT

A system and method that transforms data formats into contour metrics and further transforms each contour of that mapping into contours pattern metric sets so that each metric created has a representation of one level of contour presentation, at each iteration of the learning contour identification system defined herein. This transformation of data instance to contour metrics permits a user to take relevant data of a data set, as determined by a learning contour identification system, to machines of other types and function, for the purpose of further analysis of the patterns found and labeled by said system. The invention performs with data format representations, not limited to, signals, images, or waveform embodiments so as to identify, track, or detect patterns of, amplitudes, frequencies, phases, and density functions, within the data case and then by way of using combinations of statistical, feedback adaptive, classification, training algorithm metrics stored in hardware, identifies patterns in past data cases that repeat in future, or present data cases, so that high-percentage labeling and identification is a achieved.

30 Claims, 20 Drawing Sheets

(56) References Cited

U.S. PATENT DOCUMENTS

| | | | | |
|---|---|---|---|---|
| 7,783,112 B2* | 8/2010 | Ruch | ............... | G06K 9/3241 |
| | | | | 382/199 |
| 8,260,008 B2* | 9/2012 | Hanna | ............ | G06K 9/00604 |
| | | | | 382/100 |
| 8,290,291 B2* | 10/2012 | Lee | ............... | G06K 9/00221 |
| | | | | 382/118 |

* cited by examiner

Fig. 9. LCIS Top Level Invention Process

Training.

Pattern Classifier.

Contour Metrics Processor.

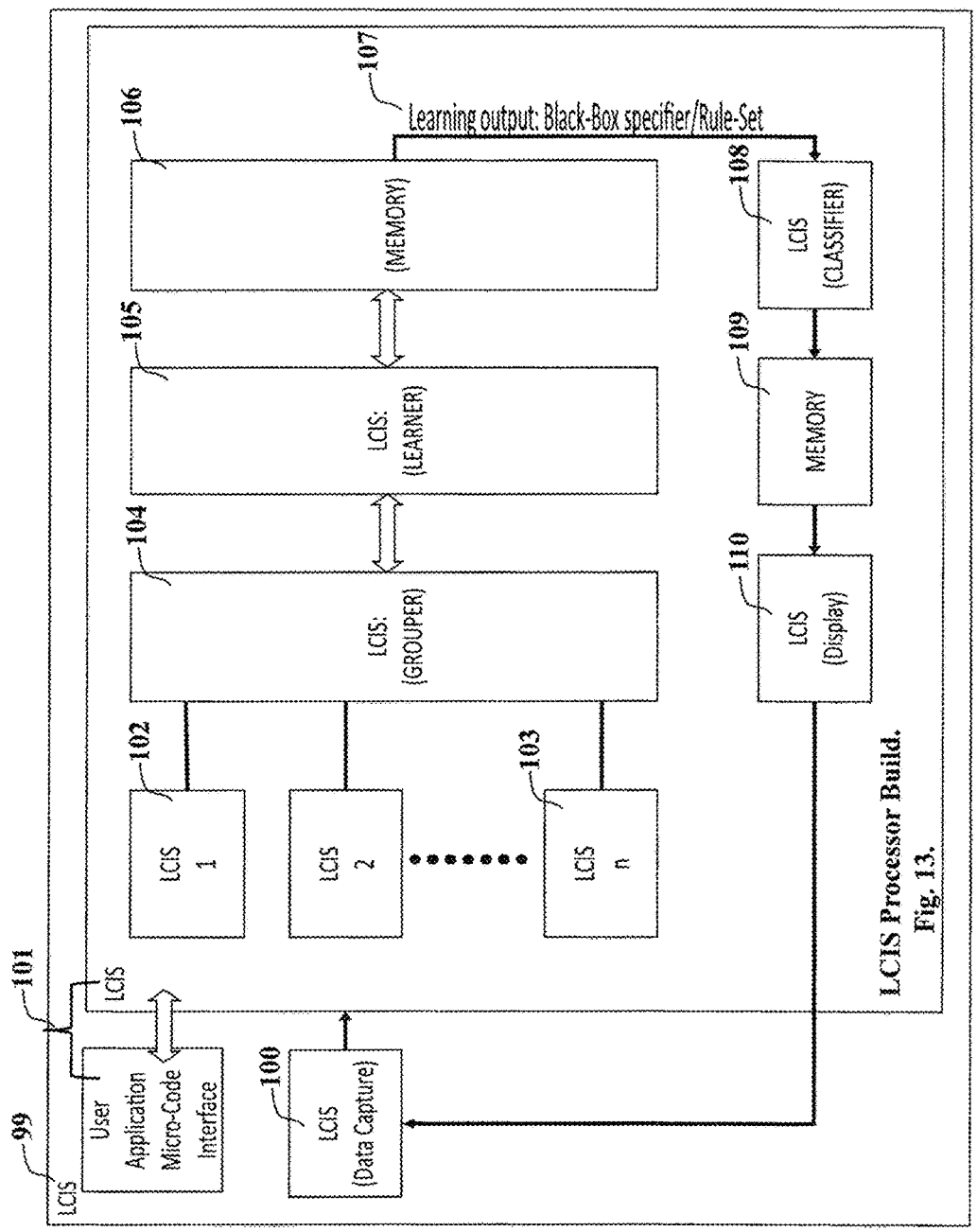

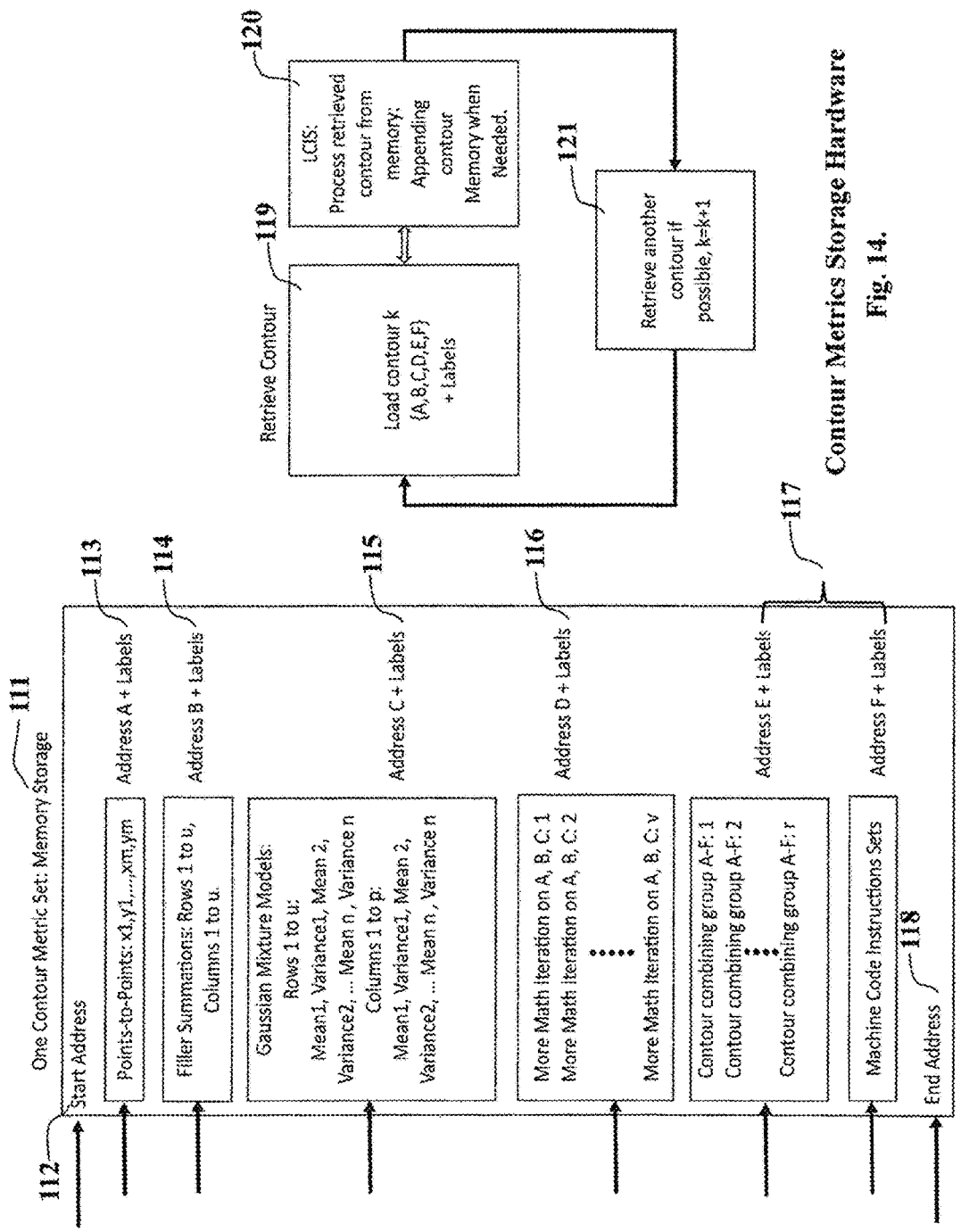
Fig. 14. Contour Metrics Storage Hardware

Contour Development and
Point-to-Point Metric Storage.

Contour Development and Point-to-Point Metric Storage.

A Statistic Metric of Preferred Embodiment

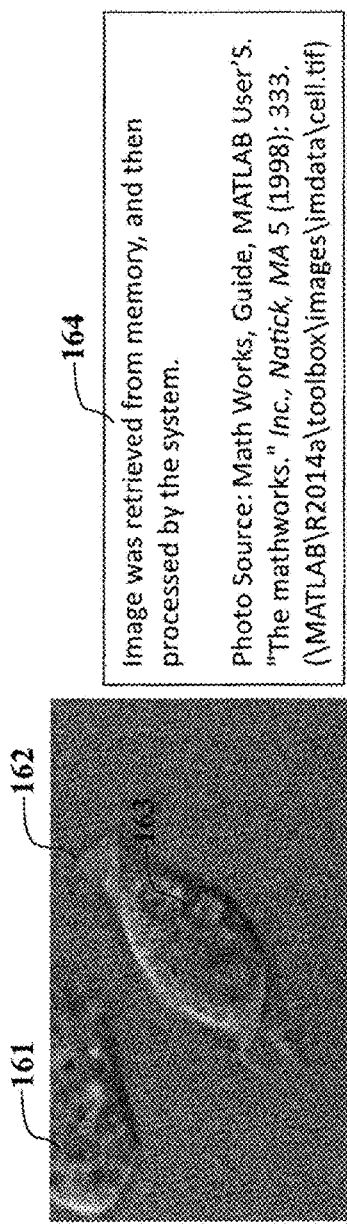
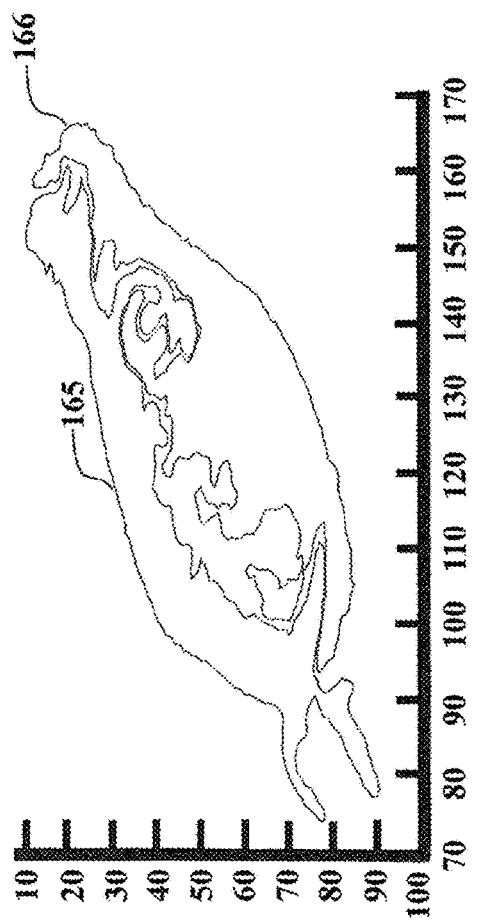
Fig. 17.
Image was retrieved from memory, and then processed by the system.
Photo Source: Math Works, Guide, MATLAB User'S. "The mathworks." *Inc, Natick, MA 5* (1998): 333. (\MATLAB\R2014a\toolbox\images\imdata\cell.tif)

LEARNING CONTOUR IDENTIFICATION SYSTEM USING PORTABLE CONTOUR METRICS DERIVED FROM CONTOUR MAPPINGS

The present application is related to and claims priority to U.S. provisional patent application, "POINT-TO-POINT REPRESENTATIONS OF ENCLOSURES OR LINES REPRESENTING OBJECTS OF GROUPS OF OBJECTS WITH DATA FORMATS," Ser. No. 62/081,513, filed on Nov. 18, 2014;

BACKGROUND OF THE INVENTION

Field of the Invention

The present invention is in the technical field of contour detection and identification within file format data types for use in pattern recognition analysis.

Description of the Related Art

Image detection algorithms locating objects (people, mechanical, signal waveform representations, or objects of any physical nature), within data formats, identify the objects for a possible purpose of tracking the object within the image. They do so whether objects are stationary (image that does not change in time or frequency) or dynamic (change in time or frequency); that is, they find an image object, but do not take the objects found outside of the source for further processing. As a result, current technologies, in image processing analysis work, desires the computational process to remain with the original source when performing calculations for any attempts to make object identification possible.

Current technologies chose not to remove the image objects searched for from the data set so that objects found may be portable to other applications that may wish to further analyze the image data instances. Current technology makes no attempt to transform the image it finds into another numerical quantity source that is not object related in a typical sense; that is, current technology does not talk about an object as an equation, it speaks of an identification processed by showing the processed image within a modified version of its own data format source. Current technology stays within the realm of the image and talks about any identifications that need to be stated to a user of such a system as a reference to the original data set and its data values from where identifications came.

There are no current methods that use metrics of recognizable and unrecognizable patterns, of as small as 1 pixel, to identify an object, instead. There are no systems that use such methods to group such patterns so that a pattern of one dimension can be paired to an entirely different dimensioned pattern in an effort to identify an object in still another dimension. There are no current methods that use a pattern as a collection of metrics to identify an object, whether or not the final identified object is identifiable by human visual experiences or expectations, and make that representation portable to other entirely different computer system designs. There are no current methods that use a pattern grouping method, whose output from a system of hardware is portable and independent of the source to define an object and fingerprint it without having to reuse irrelevant data of the source. No current method uses contours, created from contour maps of data sets (typically associated to the study of topography) to create contour metrics for a new type of system now introduced as a learning contour identification system.

These novel metrics herein are called contour metrics and are derived from contours of contour mappings, where each contour of the map has its own set of metrics stored as container sets usable by the design of the learning contour identification system. The metrics of the container sets are typically statistical density sets, areas sets, coordinate point sets, and other metrics created and determined by a system of hardware components that make up a learning object identification system. Other container sets are subsets of the same, or other analysis sets that could very well be the output of a mathematical processes, machine code instruction sets, or subsets of its own container set. The containers group together to define the objects or the groups of objects, and to essentially leave out irrelevant information of the data source for the benefit of pattern localization and final labeling. All decisions and conversions and storage locations in memory is determined by the learning contour identification system by creating a new, if you will, mathematical representation of the patterns. Essentially, the containers, then, by supplying the metrics as memory location elements, or variables (metrics of the individual containers) make the learning identification system a function processor as the metrics are plug-in modules to a learning contour identification system to make it perform a precise way that it also determines autonomously. Basically, the system and its metrics create its own encryption code set to describe a data case that has micro patterns that are found to re-occur in sets of data cases having similar data pattern representations only recognizable by the learning system hardware that created it.

The current technology does little for the purpose of further mathematical or statistical analysis on what can be learned from the object after an object is found like on a line. Current technology may identify a line, but does not provide a searchable set of metrics on that line that has relevance to the image it came from. Current technology, therefore, cannot allow the user to walk away from the source image with some pattern, in hand, as a completely different translation but having the same identification and same meaning to the application using the information detected. Current technology prefers the user and the applications using the data to remain close with source, and requires the system to show the user the object found within the source file, or to use the source file as a reference. Current technology does not attempt to "transform" an object into another quantity so that it can leave its data format environment and still have an object identity. Current technology does not attempt to provide a user with a process form derived entirely from hardware and its application software control, which not only identifies the shape, but fingerprints the pattern by a sequence of metric representations of a pattern.

SUMMARY OF THE INVENTION

The present invention is a systems of transforming data into contour maps and its individual contours into contour metrics (a whole that unites or consists of many diverse elements that can be identified as a line or closed shaped, one or multidimensional) for the purpose of using a plurality of contour pattern metrics of past data to identify contour patterns within present data using the learning contour identification system to transform inputs, and to then manage and create these patterns and contour metrics in both training (past data) and test (present) cases.

As a system and method, a complete summary further includes:

A method performed by one or more computers, capable of operating in plural parallel, plural serial, or singular format processor systems. A method comprising a means of obtaining electronic or mechanically generated data from a single or plurality of electronic or mechanical measurement devices, or image capturing devices, which configure said data into mechanical, machine, or electronic computer readable data representations of a data case, allowing for pattern, contours, and background wholes, with data having wholes with or without boundaries, or fillers, that are numeric, binary, machine code, or symbolic, or computer hardware readable types, in parts or in combinations of parts, to represent enclosure representations of desire to user or machine, whose enclosures may be identified by pattern, system, or contour shape, by self-learning algorithms, mechanical mechanisms, or human generated real-time pattern generators, in singular or plural dimensional form, with distinguished or undistinguished human shape such as signals, of singular or plural dimension, having or not having physical unit value label restrictions of said whole, part, or combinations of whole and parts being singular, or of the plurality, with all wholes having system identifiable wholes representing system feedback needs in singular or plural form, by same singular or plural systems of machines for mechanical processing methods, computer processor methods, or human interface processes, which manually adjust data of computer systems, and/or by reinserting into said computers, or into a machine/computer system's communication process, for purpose of enhancements of outputs, security of inputs, or reduction of inputs of said system, finalizing data output by storing said data measured into a machine of measurement equipment's, or system's attachments, without restriction of dimensional, serial, matrix, or mathematical file type format, compressed or uncompressed, or finalizing data output in computer file type format stored in a mobile, online, or transferable format that can be read by a computer, human, or mechanical retrievable format usable by said patent which can be then readable at present or future time lines without need of identical preprocessing of said machine, computer, mechanical or human inputs, and are readable by said mechanical or computer processing machines or human input systems designed for the Processing of said data obtained, wherein processing transforms to a another mobile use of data, or data storage, disconnected from original data storage type, data source, and measurement purpose, all patterns, images, desired or unidentifiable to human visual expectations, into another file format collected and trained on, in part, or in whole, or in planer format which may be a layer of a two dimensional projection within a multidimensional axis format of data, to be collected and stored as a manifold representation processing code, where a manifold is a single contour metric, of a contour mapping of a data case, which is a coordinate point set enclosure of an pattern that has thickness, or of a line made to have thickness by available, or intervention insertion, of neighboring boarder points, of numeric or symbolic format, of pattern defining a known or unknown shape enclosure, to a metric level of determination set by computer, mechanical, biological entity, or human interaction, and where a manifold representation is a manifold storage of a singular or plural detected contour pattern metric set, stored as a representation coded data set of contours of patterns, described by each manifold grouping, decided upon by feedback actions of computer algorithms, computer or mechanical firmware, electronic component hardware or firmware, software program, or mechanical or human intervention, that are singular or plural in whole, with manifold representation code elements, of singular or plural dimension, in storage format of singular meaning of representation of detected pattern whole, singularly or in plurality in combination with other manifold representation codes of single or plural dimension, with each manifold representation code element, of possible singular or plural manifold representations, of single or plural elements of manifolds, of new starting level or beginning, grouped or ungrouped, higher dimension of layer or grouping, without precedence, as decided on by computer, human intervention, mechanical device, or computer process, where each manifold representation code, of single or plural quantity, in single or higher dimension, identifies singular or plural grouping by computer, human or biological intervention, mechanical, or electronic hardware, firmware, or software, which is of a single or plurality of measured data acquisitions, retrieved by a data acquisition instrument, in part, or in whole, where the manifold representation code whole is of singular, or plural form, with individual manifold representation codes of plural elements, or multi-dimensional elements, for the purpose of identifying a inventions hardware processor, learned, mechanical or computer or electronic component, or electronic display generated, pattern of interest, within a data acquisition data set, or within its own manifold representation code, of a computer algorithm without human controlled input and output parameters of processor limits, or with same human controlled parameters, with parameters determined by manual, mechanical, or computer firmware training, of mechanical or computer processors, and their algorithms, or from feedback error optimizations within said systems of hardware, from past data in plurality, or present data in singularity or plurality, as transformed by same system, or via patent herein, in iteration, or feedback format, following hardware and human interventions measured, or computer algorithm measured, and patent transformation iterations, without precedence, with input source data to patent processor hardware, in plurality, or singularly, requiring measurement data acquisition, occurring at least once following in singular or plural acquisitions and storages, in part or in whole, in future or present timelines, or in real time processing through human or biological intervention, or computer or mechanical or electronic display, or electronic component intervention, for use with, in part or in whole, newly acquired data sets of start, or future acquisitions, or future and present, or real-time, patent processed, hardware, data acquisition patent transformation acquisitions, to be patent hardware processor characterized, for final output pattern identification by patent hardware characterizer by means of choices made by computer algorithm, electronic hardware, display output stored and retrieved, in plurality or singularity repetition, or by firmware, containing, or interacting, with patent, or human or biological being (disease, genome, cat, dog, chimpanzee, etc.), as desired or by computer processor, electronic hardware component, by findings of generated output report, of unidentifiable patterns, within acquisitioned data, input to patent processor, unlabeled, or human or biological recognizable feedback, labeled or by manifold, or manifold representation codes, used in present, claiming future or present pattern identification occurrences, in terms of probability, a statistic, a mathematical representation of variables, a signal, or a metric, all or combinations of, defining degree of success of detection correctness in label predetermined, or approximated, through learning algorithms, written in software or firmware, or implemented by singular or plurality of electronic components, with singular or plurality of successful detection, hardware system processed manifold representation codes, media or medium stored, that is retrievable, for use in future or present processing, by computer, by human, mechanical system, or by electronic component or display device, defining past or present or future patent pattern identification classification output finalization accuracy, of plural or singular measurement data acquisition input transformations, or of transformations that have been preprocessed in a plurality form, as a learning event, which is processed by algorithms whose input is the output by systems of electronic, human intervention, electronic display, or mechanical, or computer electronic components of singular or plurality combinations, or is processed by manifold representation codes created by said patent, for future accuracy decision metrics, or present or future or past accuracy decision metrics, or for real-time accuracy of detection decision metrics, for use as patent characterization output of pattern identification processor hardware system, with output for display, or software processor, for reporting or analysis determination of detection correctness, where correctness metric representations are probability or statistical metrics, usable by human, by computer, or by mechanical hardware, within a defined hardware system of electronic components of singular or plural combination, or within a hardware system with firmware, or controlled by software algorithm codes, or electronic singular or plural combinations, or a human determined measurement correctness margin metric, with human intervention passed to patent transformation of data acquisition of this claim or capture device, with patent result output, characterization, metrically describing a degree of accurate detection, of manifold representation code approximations, of detected output pattern label of process characterizer, of some margin of error, with repeatability and re-occurring act of nature described through multiple findings of micro-level reoccurrences, found in patent transformed data to manifold representation of pattern, of learned interest, determined from patent transformation and characterization, without need of future data, tested or untested, and without need or re-measurement and re-process of patent transformations, in representation of a look-up table human or computer hardware format retrievable where training sufficiently predicts future to stated probability of identification determined by training, representative of confusion matrix format or its plurality, which is a human, computer, or mechanically labeled, singular or plural system, of singular pattern of interest, or a biological labeled pattern of interest, of same system of hardware possibilities, human or not human labeled interest, signal labeled interest of single or plural dimension, human or not security labeled signal interest of single or plural dimension, human or not, network communication used labeled or unused label of detection, analog or computer received data types, of known or unknown information sources that have no identifiable human interest, labels, called a manifold representation output of the characterizer, where output manifold representation code wholes, singular, or plural, represent a singular or plural form of output identified pattern manifold representation code, labeling detected output of pattern, or for further analysis, decided by training of interest, or not, by human, computer, or electronic component of singular or plural combinations, with output manifold representation code, of past or present, or real-time processing, interest decided upon by mechanical device, computer program, computer firmware, hardware firmware, or biological input, where data is numerical, binary, symbolic, singular, or of plural pattern groupings, decided by singular or plural computer processing, using human manual interface decisions to data grouping, or computer feedback evaluation and re-input of analyzed data grouping, of data captured pattern manifold representation codes, of pattern detected groups of singular or plurality form, of human identifiable pattern wholes, or of computer, hardware, machine, displays, or electronic component singular or plural combinations of identifiable pattern wholes, that provide final manifold representations, as a stop process of patent hardware, reporting output of a characterized detected pattern, determined from single, or plurality of repetitions of training processing, and characterizations processing, of training manifold representation codes, or of testing manifold representation codes, or combinations of the two, making one iteration of singular or plurality of input training data acquisitions, generating defined plural or singularity of manifolds, manifold representation codes of plural or singular groupings, singular or plural statistics, or number or symbolic representation metrics, for final classification output, that are not manifolds or manifold representations codes, but metrics providing same metric, of numerical or symbolic metrics, defining patent pattern detection process accuracy, which provide a metric of accuracy of same pattern detection, resulting from training decision rules, created at end of singular or plural repetition of patent hardware system process, of training algorithm outputs that are not rules, but learning to report optimum image identification labeling, or unlabeled, of singular or plural form, Where the term "manifold" is synonymous with a single contour of a contour mapping as a container of metrics describing the contour and where "codes" and "code" is synonymous with the sequence of metrics stored in the manifold, or single contour container of a plurality of other manifolds, codes, metrics, and contour mappings, unless stated otherwise in the specification or claims.

BRIEF DESCRIPTION OF THE DRAWINGS

In FIG. 2, the magnitude 1 represents a background magnitude value of one, where any other numbered magnitude could represent an actual pattern in an image. In this case, the example is saying that a magnitude of 5 represents a pattern, not necessarily the same as the other pattern of magnitude 5, within one image. The figure, as given, represents a separated image pattern, from other patterns, by one unit. Patterns without a one unit separation, on its all sides, will be considered a grouped pattern. The entire matrix represents the entire pixel-by-pixel representation of the data format image storage container it is used to represent. In the example, then, it is a 5×8 image of data points. (Note: image and pattern are used interchangeably. An image can be an pattern, for example. Or, an image can be an pattern within a image.)

In FIG. 5, twenty divisions are shown so as to maximize "correct area representations," of the shape manifolds, created by the intensity values of 23, 24, and 25, through process, FIG. 1.

FIG. 13 is the high-level description of the system describing a complete learning contour identification system composing of the user application control 101, the training module, and the classifier, and the results when metrics are used in both. A LCIS system can be systems of system as shown in 99 through 110. The LCIS system of 104 through 106 can be a grouper of the contour pattern metrics, learner of the contour pattern metrics grouped and iterated through with the grouper 104, and both 104 and 105 can work with memory 105, or interact with plug-in modules 102 through n instances of 103. Then the system output of the black-box learner or the rule-based learner 107, can be sent to the classifier 108, whose output is stored in 109, and then displayed in 110 and the whole process repeated. This whole system 100 to 110 can be another LCIS system that can be a plug-in module 102, as well. To control the whole process which turns it one, and customizes, application software can be developed as a module 101. This is necessary or there is no way to turn it on and operate it.

FIG. 14 is the memory hardware describing how the contour pattern metric set instruction sets are stored in memory by learning contour identification system. A single contour pattern metric set, from a contour mapping, is stored between two addresses 112 and 118. It is appended too based on the LCIS needs 120. A basic preferred embodiment structure of a contour pattern metric that can be stored as an external memory container for portability, consists of a coordinate point set, 113, a filler, 114, a statistic where Gaussian Misture Model output components are stored 115, some more math outputs like possibly area outputs of row, and columns, 116, and metrics of other contour pattern metrics that have been group through contour maps of possibly other dimensions. Item 117 then is a set of metrics 113 through itself 117, or basically iterations of contents between 112 and 118 appended between 112 and 118. Items 119 through 121 represent a repetitive process of adding more contour patterns to the metrics between 112 and 118. The result is a code, a contour pattern metric code, or a manifold representation code. It defines only one pattern and can be used to draw that pattern, and all metrics can be used to by other programs to manipulate these metrics. This means that the finger print is coded into a sequence of outputs stored as sets, and since they are all derived from the contour, the pattern, can be used in a training environment, or by itself without training at all. Training allows the user to use the metrics of past data to determine of the pattern exist in future data. If the statistics are Gaussian, then because of the Central Limit Theorem, those patterns described by Gaussian patterns will repeat in the future so the confusion matrix of the past data will be highly representative of the future. This is very important to the preferred embodiment as it means that voice identification is easily identified in present data if past data is given as voice is natural, and therefore its micro patterns found within a signal capture will definitely repeat in the future. It also means that the voice can be removed from noise.

FIG. 17 is a generated display of the contour metric set defined enclosure (manifold) of a pattern in a two pattern image. It is another embodiment application example of actual implementation of the invention. Image 161 through 163 represents a cancer cell given as a sample image provided as test images by Mathwork's MatLab software analysis test image directory. That image in its entirety is retrieved from a file format of TIF converted and transformed into a contour map whose contours are transformed into many contour pattern metrics by the learning contour identification system. The boarder of the one pattern in 162 would be the border or borders of elements inside as 163 of the dark circle to identify these two cancer cells (the other 161) as labeled objects when using current state of the art attempt to do to label the object as a cancer cell which is what it is. Image 165 and 166 represents the output of FIG. 1. The contour learning identification system described herein provided 165 and 166 at the conclusion of its process. These two images are the only images the learning system needs now and learning is on the metrics only, no longer is learning on the data within the image capture. The learning contour identification system using the contour manifolds found two patterns 165 and 166 and put them together to classify the object above. All background information of 161 and 162 is now considered irrelevant to what the learning contour identification considers necessary to describe the cancer and that is determined autonomously or by user intervention if the user desires to use the application plug-in module to modify it. And, as the contour pattern metrics describe 165 and 166, the file format the metrics stored in by the learning contour identification system can be taken to any application software to reproduce the image from its contour pattern coordinate point-set metric, losing no information of where it was in the image as location is stored in the other metrics, and through other metrics taken, the object can be squeezed or morphed without changing identity.

DETAILED DESCRIPTION OF THE INVENTION

Figure 1:
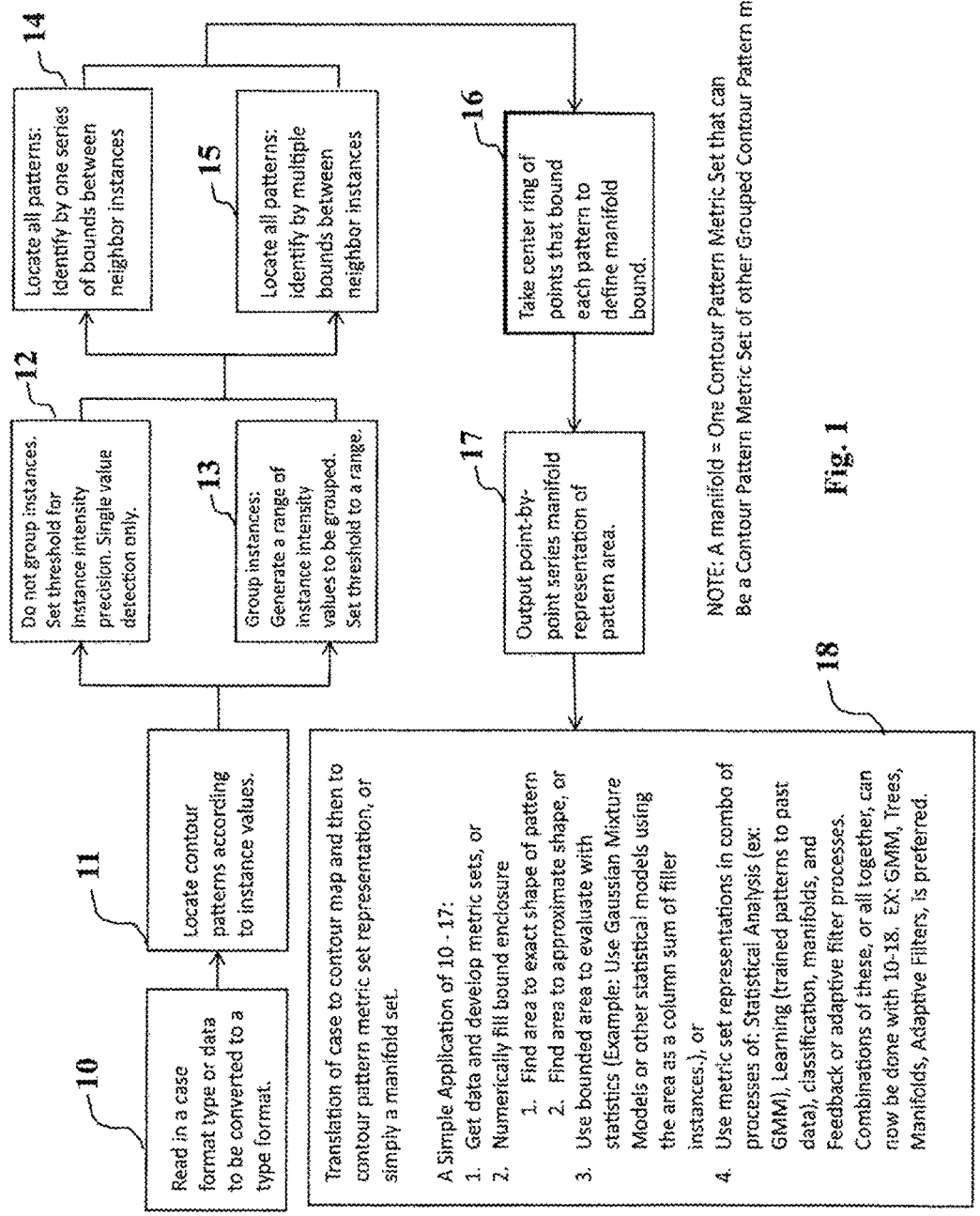
FIG. 1 is a step-by-step flow diagram of the preferred embodiment of a process of grouping contour pattern metric sets of the set of contours of a contour mapped training and test case.

Terms are defined so that they do not become limiting parameters of the invention, but rather a means of written communication of the methods, means and apparatus of the invention when necessary to point out particulars.

Manifold: A contour, of plurality of contours of a contour mapping of a data case, has a plurality of metrics to it. It is a contour container of metrics which is used interchangeably in this document with contour pattern metric sets, or contour metric containers. It is used with manifold representation code to say that it is a top level description of a single contour.

Manifold Code: Code is simply the metrics defined by the manifold, or the contour patter metric set container. It is a code, because it is the sequence from which the processor reads from memory the description of the pattern it identifies and to be used in the training module and the classifier test case.

Case: In the application of the invention the term "case" is generally found to be paired with data, training, or test. Data has a file format, a data format, and a data type, and therefore, so does a case. Data can be internal, and can be external, and therefore, the case can be considered used in that way as well. Case, in simple use of terms, represents data of any data format (i.e., analog, digital, symbol, etc.) or mixtures of any data type (char, int, and so on), to be acquired (internally or externally) and processed (stored retrieved as appropriate as a file format or data format) in no particular order by no particular means as long as the output justifies the means. For a general example, a data case can be received in compressed format sent serially in a communication channel which could be a real-time received data case. It is stored in a format readable by a system using it. A set of simple examples would comprise: data formats which can be compressed such as MPEG or jpeg, or an image formats such as jpeg, png, eps, gif or any format or data type recalled to form an image, or a movie, or audio, or combinations of file formats, data formats and data types. Or, it can be a web based format such as HTML, or even a non-numerical data type or format such as symbols as these can be converted to any other desired format or data type by a process method designed to do so.

A Training Case: A case of data that happened in the past. It has a known label. For example, one is to take a 100 pictures of chairs. There are only two types of chairs in the pictures: Rocking Chair, and Non-rocking chairs. The label's examples would be, possibly RC, and NonRC or similarities, for each training case as given by the system using it, or given by the system capturing it. The point is that it is of past data to be used for training a learning module.

A Test Case: A case of data that happens now, or achieved in the present. It has a label, but it is of uncertain labelling. The labeling examples would be possibly blank, NA, or a guess, or user supplied. The format can be converted to a format necessary for the learning to the training case that will be necessary for deciding, for example, if the test case was a Rocking Chair, or a Non-Rocking chair as seen in past data which were training cases.

Communication channel: The path that data is received or transmitted over. Simple examples, not taken as a completion of the possibilities, can be via a waveguide device such as a computer bus, which may consists of wires which are also wave guides, or over the air by way of a transmitting via an antenna and receiving via antenna where the channel now becomes the air space between transmitting device and receiving device. The primary point is that data is sent in a format that is necessary to be received by the receiving device and it is done through the means of a channel of communication between a user, machine, or combinations of same.

Recording or Data Capture Device: The device used to take information and store it into a usable recordable format that is stored in volatile or non-volatile memory for immediate processing use, or later mobile use, or combinations of same. Some examples to be considered may be a camera, a scanner, a voice recorder, a microphone, an eye scanner, a thermal imager, CAT scanner, a scanned printout of a paper graph, or the output of an application package (printout to paper then scanned, or image then saved, for an example) that plots an equation's dependent and independent variables. It can also be a real-time operating system (RTOS) that serves as an application processing of data as it comes into a system.

Data: Are possibly point instances within a container such as a file, or located between two address locations in memory. The data within the container can be numeric, can be wrapped into a file of some data type structure commonly referred to as a digital file type structures, or could be an output of a capture device that is of a RTOS (real-time operating system) nature, for example. It can also be a waveform, or can be multi-dimensionally defined by some multi-dimensional coordinate system commonly known to graphing. It can be vector based and described by a vector space it is defined over, or that it explains. These are just a few examples of "data", and their formats or data types can be: numerical, binary, hex values, or a simply in a format readable by some system that desires to use it. The point is, data is never a limitation to a system as it is handled by the transformation processor of the LCIS.

A Contour: In this invention, an enclosure of data instances having no specific shape. For example, a contour can look like a chair, but may not be labeled as one without having other contours combine to make that claim. This is a primary feature of the invention in that contours in combination are a means to an identification of "data" or its parts, not necessarily the shape they make of the object that is user identifiable. What is not clear is that the contour does not necessarily take on the shape of a chair, and a shape of a spot for example, but a contour could take on parts of the chair and parts of the spot to form a contour that would only be identifiable to the system, and not necessarily the user unless a high degree of visual attention is paid to each micro part of each item making up the contour. What is happening is that unnecessary information of doing a job, that is to label the chair, is removed from processing all the data in the case, thus giving a hardware system a great deal of data reduction capability reducing computational complexity, and when considering multiple "cases", high-dimensional spaces can be converted to fewer dimensional spaces.

Metrics: Metrics are precisely defined as given herein. The term "metric" is a means of discussing the representation of a group of quantifiable measures, having labels naming the group of measures. For an example, to ease the extreme complexity of the term, take statistics as a metric label. Statistics, in one capacity, can be described by saying a collection of means and variances. A "metric", as used by the patent, can then be the mean, or the plurality of means as a vector of measures. For example, say we have 10 numerical representations of means of test scores, each mean representing a use of one year worth of a final exam scores. Metrics, in a system described by this patent, have to be stored in memory in a manner that accommodates order and dimensional size as they are processed. This is to imply that begin and end memory address locations are dynamic in that they expand and contract. It also implies that a metric and its contents have a location within memory that is system trackable, which further implies that order as processed and order as stored in memory be system determined to allow for metric parts or wholes to be extracted from memory correctly. For example, what if the metric of means, in the example of test scores, includes two additional test score years? Memory of the metric location label, "Statistics", with sub-name, possibly "means", would be an address change of "means" from holding 10 items, to now holding 12 items of numerical representations of mean calculations. Metrics are only limited by the memory storage process of the system (i.e., a system controller capable of storage maintenance from 10 items to 12, and capable of going from "means" to "means and variances", for example), and its acquiring process (i.e., execution of machine language math instructions, for example), neither of which have to be complex in storage tracking, they just need references that can be tracked for use in a system which uses them and stores them and accesses them in a manner that is an efficient manner so as to accommodate iterations of access. Memory also can be volatile or non-volatile to handle large datasets. The method given is only one possibility. Further, "metrics" can be thought of as math calculation "results" that are stored as vectors, or sets, or labels, and so on. Or, can now be sub-sets even within their own metric, to become the metrics elements, called sub-metrics. The main point is that a metric is a sequence of data values (each data value being the 10 values described as mean values, for an example) that have a specific meaning in why, and where, it is pulled from memory and stored in memory. As the metric has a specific "identity" purpose, for example, to represent 10 or 12 years of test scores, it also has a very specific "application" purpose, to decide, for example, if the teacher should be fired. The metric can also facilitate a systems needs for further analysis of individual components of the metric mean, meanings. As an example, the $5^{th}$ item pulled from memory location 5 of 10, of "means", would be the $5^{th}$ "year" meaning of the test score, whose value may decide on the firing of the teacher by the system using the metric "Statistics". Another important point of concept to understand, is that the test score mean, is ultimately a mathematical calculation without the steps; therefore, so too is the metric value a system process of mathematical steps it represents. For example, all values of means now have mathematical equation meaning. The end result was comprised from a function and an execution of what that function led the system to calculate; that was the final set of results stored as means. Metric "mean", of "Statistics", now takes on the calculation of an equation of finding a mean. Another metric could contain the values used to find those means also to be stored under "Statistics". Therefore metrics of the mean could be considered mathematical process metrics with metric storage locations being the methods used to calculate a mean of test scores. The address location then becomes the process, while leaving out any other needs for reprocessing or processing in a system in which patterns need to be found. This makes even none-rule based systems, known as black-boxed systems in training worlds, rule-based or non-transparent learning systems. This is so because complex series of calculations are now reduced to their metrics, leaving out having to recreate the path that produced them, and instead providing other parameters that are useful such as learning off the number of elements of the metric itself, which can identify pattern likelihood simply due to the frequency of which the number of elements populate the metric. The point of the metric, then, is to make portable the relevant information of the process used to label an identity of a desired set of values (or calculations or other sub-metrics) by the system using these values. A set of metrics is portable because the metric container can now be stored in a file and transported to an application for further analyses of a case of data. This is possible as all relevant information of the case data set is contained in the metrics. This means metrics can be used as a key for data encryption, and a key of this nature is not crackable by algorithms as an algorithm is not what created it. What has happened in a metric creation is that all that is relevant has been placed in memory, and all that was relevant can now be used as function variables of differing data types. (All that is irrelevant can also be stored as a metric) And, all that is relevant is decided upon by the system process, which implies that all that is decided on can be that in a learning module. This becomes an equation of sorts, because the metrics are tied to the data case through transformations of the data case data. The metric is a container that describes, mathematically, essentially, the patterns found. Also, the metrics have meaning only to that data case, and in the application, only to patterns that define the data case the system chose important in the data case. Analysis then, only need be done once, no further instances through firmware, due to respective system processes, need to be performed, making this ideal for learning hardware implementation. For example, if communications between two individuals must be communicated precisely, and secretly, the recording of the primary speaker saying specific sentences (for accuracy improvements) is transformed in to a set of metrics by the micro code or PGA or FPGA, and so on. The metrics can be at a base station to decrypt as the metric is portable. It can even be sent over a line because the data is meaningless to a person hacking a line as it is just a bunch of useless numbers that can never be put together to get anything intelligible. The metrics that cannot be brute forced to be decrypted as the other training data used to create the metrics, would be needed and the training process exactly duplicated which is improbable in the maximum sense. So, again, it transforms a pattern of interest into a sequence equation of sorts, whose elements are clear only to the system that created it, which is the training module.

Contour Map: A mapping of contours that are groupings of values of areas that have a similar relevance. In geographical sense, it is the vertical element between distances in an x and y, referred to as the z axis, which are contour maps of elevations. The topographical contour mapping would result in similar area enclosure of data points. Increasing the number of contours then increases the detail of the hilly terrain. That same concept can be applied to a range of data that is found to be bounded by two points in x, and y, having those values represent the elevations. In the preferred embodiment, topographical methods lead to continuous lines where the preferred embodiment constrains itself to matrix separations that can be converted to continuous lines but for the sake of faster processing does not chose to in the transformation of a case to a contour map. Contours can be lines, but the system will enclose those lines by boarders of the pattern of interest, or by neighboring points, to create an enclosed contour surrounding the coordinate point sets of interest. The points, for example, in a dataset to be used for topographical reasons are contours connecting points of elevation. This methodology is also used to enclose pixel intensities located at pixel point, x, and pixel point y. The methodology could also be applied to any set of values whose point's locations are given an x location and a y location, or a higher dimension. This is a very important aspect of the invention, as the contour coordinate point-to-point representation has no shape requirements or known information. The metric can be a part of one contour of two different dimensions within a single dimension as contours in this contour mapping can use parts of one contour to make up another contour, all through its metrics, groupings, and training of the LCIS that makes up this embodiment.

A Contour of Interest or Pattern of Interest: A contour that looks like a chair may not be a chair unless the contour of a black spot on a wall says it is a chair of interest. A dynamically changing tumor may not be a tumor of type x unless the combination of contours of a blood clot also change or maintain shape with this contour. Another example is security. For example, the voice peak contours represented by the speaker taken from a microphone, or even a software cut and paste of a graph within an application package (which has been stored in a system readable format), may not be the speaker unless the contours of the noise background is also part of the peaks. The primary point is to know that a contour is a pattern that may not have a user identifiable visually described form. It is a collection of instances that have meaning to an identifier through a learning process that uses past contours.

Let us now describe a preferred embodiment. We use manifold and contour pattern metric sets interchangeably to mean the same thing, but in ways that give more clarification. If a top level description is desired to convey a meaning, manifold is thought best as it is quicker to write. If details and driving a point home is desired, such as coming right off a contour mapping process, "contour pattern metric sets" is generally used. If manifold is used, it is usually referred to as a code because the metrics within the manifold are being used by a LCIS (Learning Contour Identification System) process, in whole or part. First the method will be given and then the hardware system.

To obtain a manifold, again, a contour pattern metric set, of any digital image file format (types: raster image formats, pixel and Web file formats, meta/vector image file formats, bitmap file formats, compression file formats, radiometric file formats (temperature and image), GIF image file formats, animation file formats, transparency file formats, interlaced and non-interlaced file formats, JPEG image file formats, and progressive JPEG file formats) one requires the process of FIG. 1, Steps 10 through 17, with 18 formatting the outcome.

The goal of the process of the invention is to identify each contour pattern, and background contour patterns, within a data format, according to manifold multi-groupings (FIG. 1, item 13), or singularity manifold (FIG. 1, item 12) grouping thresholds. These can be determined by look-up processes (each intensity value is its own manifold so it implies searching for all unique intensities and then enclosing); determined by spacing distances (same intensity, separation by different intensity, or ranges); determined by randomly chosen ranges (fast contour pattern searches can remove manifold patterns if training set states that manifold is of no interest, or of interest, so randomly guessing can enhance decision in choices of what combinations of 12-15 of FIG. 1 to perform); determined by training or look-up tables by any process that has learned through the training of past data formats of similar or dissimilar contour patterns, also manifold identified through FIG. 1, 10-17, relative to the current source file, used in FIG. 1 (examples are: Machine Learning, Data Mining, Neural Networks, and so on as given in 18, FIG. 1.); determined by classification methods (decision trees, statistical processes analysis, such as statistic models such as Gaussian Mixture Models (GMM)); determined by reclassification of re-use of invention FIG. 1 through iteration and eliminations of manifolds generated by FIG. 1, generated through a feedback or adaptive filter process as stated in 18 of FIG. 1.

The choice of manifold size, shape, or distance between same, with the invention of FIG. 1, is determined by single, or combinations of, statistical analysis routines (Gaussian Mixture Models for one example), classification routines (Classification and Regression Trees (CART) for one example), past training of past data for future predictions (Machine Learning training on past data or known data format data), and feedback (Adaptive Filtering of data, for one example). For example, FIG. 7, FIG. 8, FIG. 9, all use the process of FIG. 1, 10-17, in a (patent application by same inventor of FIG. 1, to be applied for, if necessary) GMM, Tree, Machine Learning, Adaptive process hybrid algorithm, given in 18, of FIG. 1. By using FIG. 1, application embodiments of FIG. 1 can be witnessed "currently functional" in FIGS. 7 through 9. The examples of the different file format types of thermal data, signal data, and image data, through one process, is possible because each manifold is represented by its own set of points by way of FIG. 1. Contour patterns can, therefore, be removed from the digital image file format and identified away from the source file as an individual contour pattern with metric named identity and shape closure repeatability. With classification trees, each contour pattern can then be combined with other manifold contour patterns, according to a training set the tree was created by, in the feedback process. If the tree could not classify the contour pattern, the adaptation process (18, FIG. 1) changes the FIG. 1 choices in 12-15, and re-tries to classify the contour pattern through GMM and Tree classification. Also, because of this metrics defined manifold, "each" manifold can be metrics manipulated to show area by filling in the manifold with weighted unity values that can be used, for one, to represent density. If manifolds are filled with one's, for example, all ones (1's) in the columns, defined by the y-axis, are summed along the x-axis so that a density representation can be found in the x-axis of this bin like histogram. If the same is done in the y-axis, where column are those of the x-axis, a density or probability of identity, of the contour pattern, can be created for statistical identity comparisons in the Tree feedback section of 18, FIG. 1. Performing this action then, can simplify the classification process of 18, FIG. 1, because if the density (probability distribution created by filling the manifold and summing along x-axis and y-axis) is Gaussian, there are two sets of means and variances that can represent each combination of these manifolds, or their single manifolds. And, as Gaussian distributions can be handled as linear additions of means and variances, each Gaussian distribution can be a sum of Gaussians, so many manifolds that are Gaussians can be combined into sums, or removed from their sums in a training system process. Other statistical models have linear statistical combinational characteristics, but Gaussians are more frequent in nature as stated by the Central Limit Theorem; still, they too, however, can be used along with Gaussians in the feedback process. This means that many sets of means and variances, in both x and y, can be used and sent to a tree classifier for complex identification, not to mention the additional use of areas calculated from the manifolds, and the equations of the lines generated from the manifold's coordinate point set identification.

Figure 18:
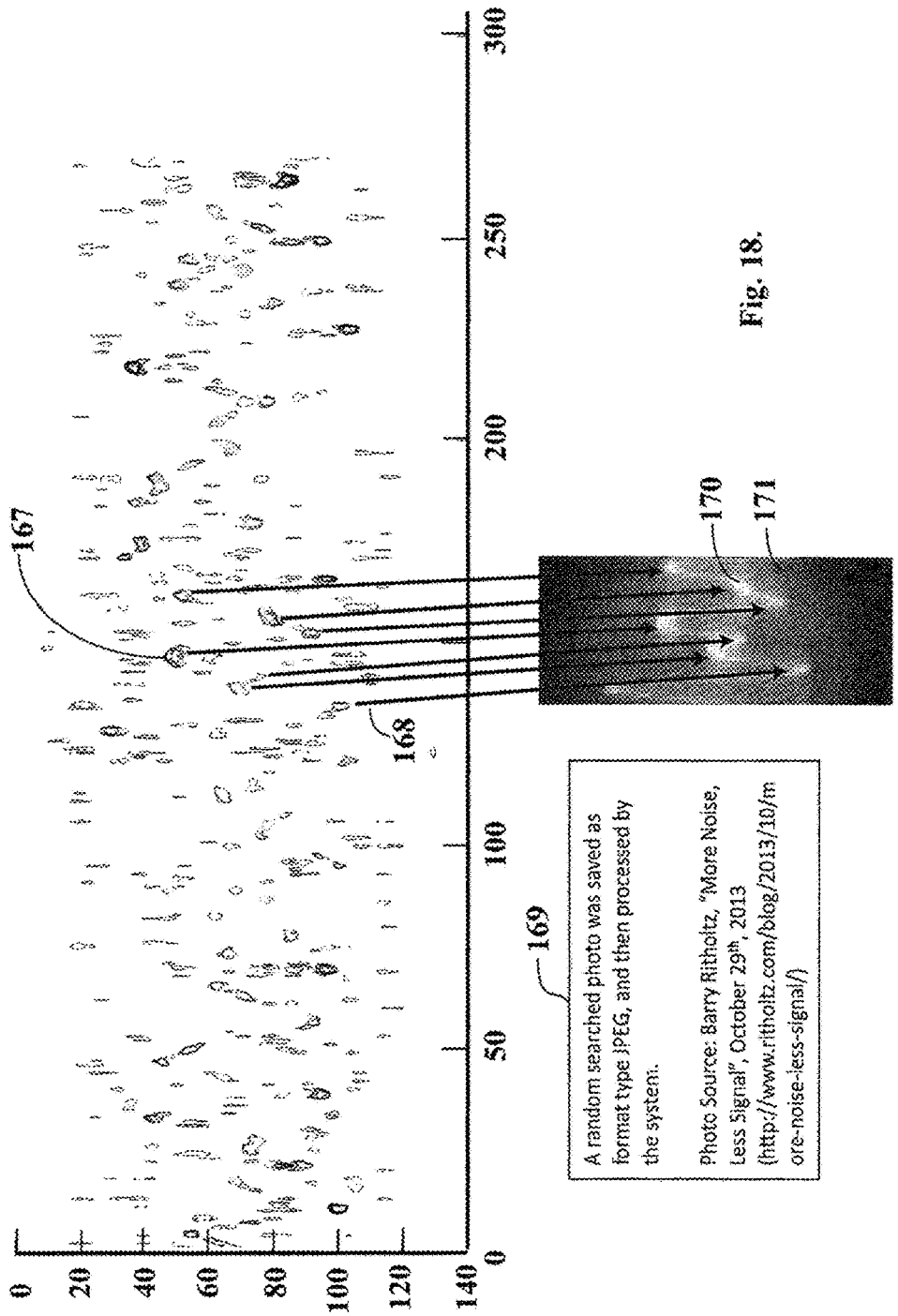
FIG. 18 is a generated display of the contour metric set defined enclosure (manifold) of a pattern in a two pattern image. It is embodiment application example two of the invention shown in FIG. 1. This image is a communications signal, in the time domain, taken from a hardware data set, stored in a digital image file format type, JPEG. The background results of noise 171, also seen in FIG. 18, are generated by process choices 12 and 14, of FIG. 1; that is, they are single manifold enclosures. The identifier 167, in the figure, represents the choice of multiple manifold patterns in process 13 and 15 of FIG. 1, which are used to track and identify patterns pointed to by arrows. It represents the grouping by way of FIG. 1 in the learning contour identification system as it detects peaks in amplitude, and detects location in time of these peaks, in 168 along the x-axis. All data in 167, and those manifolds surrounded in the background of 171, have a contour pattern metric set description that can be removed from the image without losing pattern identity (identity is given by the manifold representation of 18, FIG. 1). As in the previous embodiment example of the cancer cell, the entire signal is now in a metric, which means these metrics can encode the signal and then remove from the image set the pertinent information the metrics to be brought to another station to decrypt the signal. This metric then, is impossible to decrypt by any hacking or reception of the signal transmission as the metric describes the identification, not the image. You are left with communications that cannot be decrypted by interception by any means as the learning identification system created the metrics that define what it saw. The preferred method of four techniques of 10-17, of FIG. 1, 18, is used in combination of FIG. 1, in FIG. 18.

In FIG. 18, for example, detection of a signal, while enclosed in the noise envelope, was still found. This is essentially impossible in other pattern identification methods or other image detection methods. Also, because this manifold filling (for density and area representations in 18, FIG. 1), of the generated manifolds, scaled or left unsealed, creates a density value, area value, magnitude value, and location value of the contour pattern (as well as many sub-level equations, of the same format, depending on the number of manifolds you create for the desired level of identification), a signal now takes on a very detailed metrics defined fingerprint description. Taking empirical data (although random simulation data can be used in the same way once plotted by graphical software, whose image is then stored in a digital file and sent through FIG. 1) and identifying in this manner, gives the operator much more information about the signal that currently requires Fourier analysis. This Fourier analysis type of analysis can now be avoided, which means that FIG. 1 is a new form of performing a metric coding process in which to evaluate any electric signal type, or the like, more accurately than, in many ways, than that of Fourier analysis, as Fourier analysis cannot achieve the same results of detecting a signal in noise as FIG. 18 demonstrates. This process of FIG. 1, 10-18 is clearly will change how data will be used in analysis as no math process is able to assign multiple levels of {density, area, coordinate point set enclosure, and equation of lines} to each and every data point or cluster, as FIG. 1, demonstrated in FIGS. 7, 17 and 18.

Figure 7:
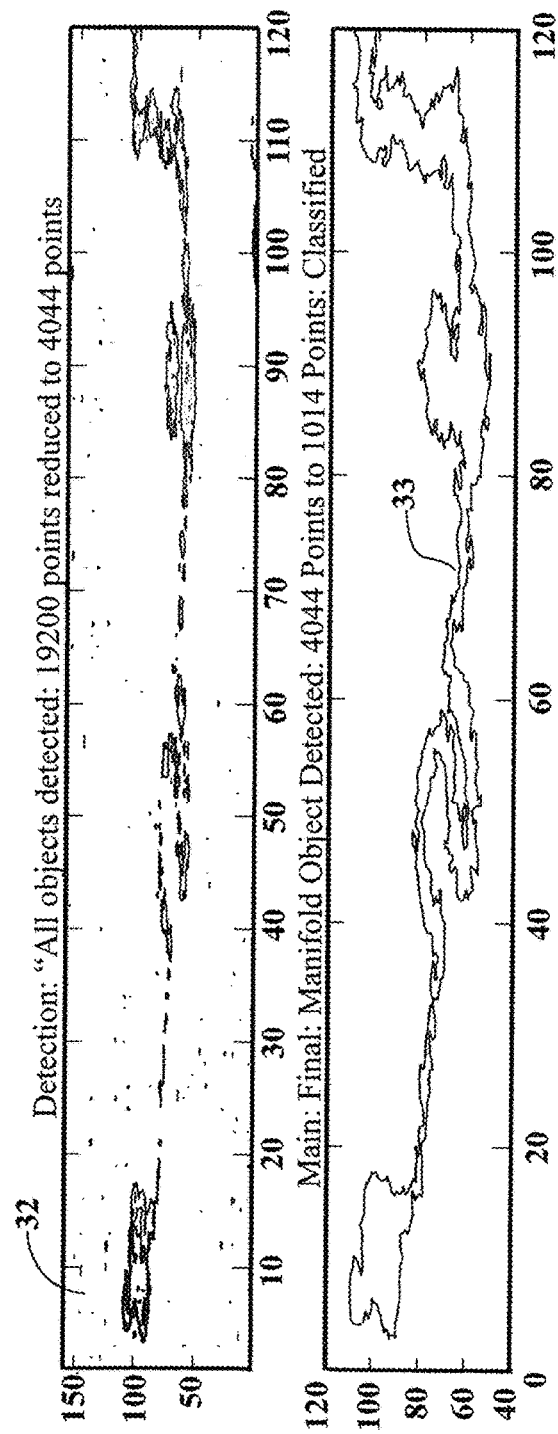
FIG. 7 is a generated display of the contour metric set defined enclosure (manifold) of a pattern in a multi-pattern image. It is embodiment application example three of the invention shown in FIG. 1. This 33 is a 1/32" thick 18K gold neckless fallen randomly to the carpet. This 34 represents a radiometric type digital image file format of the thermal image 34 of the neckless in 33. This graph 35 represents many manifolds of points generated by 12, and 14, and by 12, and 15, and by 13 and 14 of invention in FIG. 1. This graph, 36, of manifold points, represents 13 and 14 of invention FIG. 1, re-generated from mathematical representations created by manifolds of points of 35, processed through FIG. 1. The preferred method of four techniques of 10-17, of FIG. 1, 18, is used in combination in FIG. 7.

FIGS. 7, 17 and 18 show that, regardless of the data file format, not only can a spline be created to increase the number of points (smoothing) given by FIG. 1's manifold, an equation of a line through the manifold points can be generated by FIG. 1, and a metric created for it, as well as doing the same with a density value (a probability distribution equation).

By way of FIG. 18, detection of communication in some jammed channels can be detected; that speakers in multi-speaker environments can be detected and identified (for example, in the combination of GMM, Manifolds, Trees, and Adaptive Feedback Machine Learning, of a known speaker, FIG. 1 can be used to match speaker voice, to speaker image contour pattern); that recorded or real time discussions can be decoded in encrypted data sets; that images of underwater contour patterns can be detected from ultrasonic echoes; that contour patterns can be identified and detected in electromagnetic imaging's of healthcare system hardware such as MRI's, ultrasound, and other image detection processes; that detection and classification of signals and contour patterns can be done in communications and image capture systems (thermal, electromagnetic, ultrasonic, laser, and so on) in military systems (and that all can be tracked, dynamically, as well, without change to the algorithm); and that strokes, heart attacks, or biological diseases can be located in living bodies. And, for all of these, if before and after is done, changes can be identified by FIG. 1's, 18 preferred embodiment, as it learns from past data.

The process of FIG. 1 is data format independent as all data can be transformed to an intensity image set. FIG. 7, for one example, is a thermal image of a contour pattern. Thermal radiometric file types are an entirely different representation of data as the container includes a set of just temperature changes (as displayed in to the right of 31 in FIG. 7) mixed within a JPEG file format container that also contains the image 30, FIG. 7. Through the process of FIG. 1, and using 18, FIG. 1, the simulation of FIG. 1 shows that in any Statistical Analysis (of the filler of a manifold), classifier (of the statistics generated by Statistical Analysis), Machine Learning (past history training), adaptation process (feedback or adaptive filters), an contour pattern identification can be performed. The result being a complete, user only, limited level of fingerprinting, capabilities. And with the levels of manifold defined metrics representations, contour patterns can be tracked real-time (Video).

Video, as it is simply frames of data, is no more of a challenge to FIG. 1 than any other file format type.

FIG. 7, FIG. 17, and FIG. 18 are actual results of using invention FIG. 1 and the LCIS system, in 18's preferred embodiment. Also note that accuracy is not limited by the data format type, it can actually enhance it if one is cleaver.

The greater the resolution of the display device used in the file type, and then used by FIG. 1 to convert to a manifold, the greater the description of the contour pattern in terms of density and manifold shape. Therefore, the choice of the compression routine can increase or decrease detection accuracy and precision and therefore, can be used as another means of zeroing in on the contour pattern classification in 18, of FIG. 1. This implies that data format type is another means to adjust the manifold in contour pattern shape (in manner of increases, or in manner of decreases, in all concerned implications of FIG. 1), or in density (from weighted fills or identical numerical fillings of the manifold found in FIG. 1), or in its point data set, or in its area, and/or in all sub-metrics representations of the first level that FIG. 1 provides the user for metrics analysis due to single or multiple iterations of FIG. 1 of the LCIS described by FIGS. 8 through 16.

Another example of changing the accuracy of the detected and transformed contour pattern is windowing the contour pattern frame processed within the image, or within the window of the data being captured by hardware. For example, in signals, or clusters of heavy density (FIG. 1 can create manifolds of clustering densities—from weak to aggressive—so categorical data can be analyzed by invention FIG. 1, as well), it may be desired to expand out a time window of 10 seconds to 1 second so that the result spreads out the pixel density over a larger area, which then changes the manifold metrics representations to a larger manifold, or to a set of smaller manifolds (all under one manifold, if desired). These new manifold reads can be determined and calculated all through iterations of FIGS. 1, and 8 through 16, which can also be linked to the next higher level of the past manifold math representation created before expansion. For example, in FIG. 18, the electrical response ringing's found at the peaks and valleys, which cause the bright spots in 170, shown by arrows, are identified and shown visually by manifold patterns around a center ring 167 expanded in FIG. 19. In this case, the x-axis time, at one location peak point, in 170, could be expanded in both time (x-axis) and amplitude (y-axis) to focus only on the peak and time stamp investigated; that is, zooming in on 170's image point, represented by 162 in FIG. 18, is being expanded and re-evaluated by FIG. 1 and FIGS. 8-16. This action can be done at a multi-dimensional (2D, 3D, and so on) level as well. This action would change the manifold shape so that the manifold would have multiple metrics representations for just one single point. The benefit contour patterning is to thin the empirical density results to determine different sets of manifolds that may further fingerprint the contour pattern it identifies. This enhances 18's (FIG. 1) embodiment's ability to remove noise from images looking for specific contour patterns. It should be understood that keeping a density package tight, however, can reduce needless calculations of empirical results that frequently hit within a contour pattern metric set. This means that a checking routine, that verifies whether or not a point is inside a manifold or not, can be used to remove a process of evaluation of points, within the manifold, and instead process only those outside of it (or vice versa). This can reduce calculations made on repeatability calculations (points hitting continuously in one spot or area) within a manifold, or enhance error analysis of empirical data by establishing a bound, by way of FIG. 1's manifold's processed coordinate point set edge. It does so as a range of values that can be processed by FIG. 1; that is, it is then assigned as the manifold so that, unless an evaluation is outside the range, only one value contour pattern within the manifold need be processed by FIG. 1. This strength of this manifold analysis, on empirical or theoretical data, is why this can be considered somewhat as a new way of paralleling math kinds of calculations without actually doing math; that is, the results of the metrics representation in FIG. 1, 18, can be used without violation of the rules of algebra.

In the GMM, Manifold, Tree, Adaptive process, the adaptive process can adjust the window so that better detection to the training set can be determined. This windowing opens up all sorts of new uses for the manifold as one manifold of a contour pattern can be represented by many other manifolds, giving the classifier more information to decide on. Each manifold not only has its own density, its own set of points, its own probability, it also has its own set of further densities, and the like, due to iteration processing of FIGS. 1, and 8-16. The manifold contour pattern metrics identification is only as shallow as the user wishes to go. (Note: Noise (determined to be unwanted manifolds) can be removed at each level of iteration of FIG. 1.) Clusters, for example, can result in a manifold ring around the tight clusters, as well as a manifold ring around the tight and loose clusters, all processed by FIG. 1. Analyses of methods (18, of FIG. 1), already used in FIGS. 7, 17 and 18, can represent one cluster as two probability distributions, of two totally different manifold metrics representations of 18, FIG. 1. And, because the manifold patterns can be increased or decreased, the cluster can have many more than just two, in these examples, as well. This ability can help eliminate cluster overlap as the overlap of clusters can also be a manifold, which can be subtracted and added; and in the case of Gaussian Mixture Models, as the sum of two Gaussians random variables, is Gaussian by convolution, densities of manifolds that are Gaussian can be added together to create another mixture of Gaussians. For example, in FIG. 18, the inventor not only was able to remove the signal from the noise, but he also had complete control of the noise envelope; meaning that he no longer was tied to the image source as the image was completely, metrics, ID'd. Therefore, these three FIGS. 7, 17 and 18 are an example of overlap handling that invention FIGS. 1 and 8 through 16 can obtain in a manifold filler (FIG. 12, and FIG. 14), feedback (FIG. 10 and FIG. 11), statistical analysis (FIG. 15 and FIG. 16), learning contour identification hardware (LCIS) process (FIG. 1, FIG. 8 through FIG. 14).

FIG. 1 makes grouping of metrics expressions, possible, without having to worry about algebra mistakes as the metric is the code that describes the pattern decided by the LCIS system to be what is relevant. This has never been done before now, and the LCIS computational complexity is almost negligible. Again, it is in practice at this time, and demonstrated in FIGS. 7, 17 and 18 as examples working just as stated in this invention application.

To describe a simple and general embodiment of the process of creating a manifold with the steps, which yields a complete metrics expression of each and every contour pattern in a contour mapping of a test and training cases, including noise, the following description of FIG. 1 process is presented as a series of steps as used by the LCIS system FIGS. 8 through 16 and supporting FIGS. 2 through 6.

Step 1.

FIG. 1, 10, read in a digital file from a storage device (or from a capture device using cameras, scanners, or screen captures, or the like), having one of many graphic formats. (A few format "type" examples: raster formats, pixels in Web formats, Meta/Vector formats, Bitmap formats, Compression formats, GIF formats, animation formats, transparency formats, Interlaced and Non-Interlaced GIF formats, JPEG Image Formats, Progressive JPEG.) All work the same way to the process of FIG. 1. FIG. 1, 11, is used to develop the intensity matrix that represents the image in the source data format. Item 11, in FIG. 1, is making each intensity value its own manifold enclosure at this point in the process.

Step 2.

Figure 2:
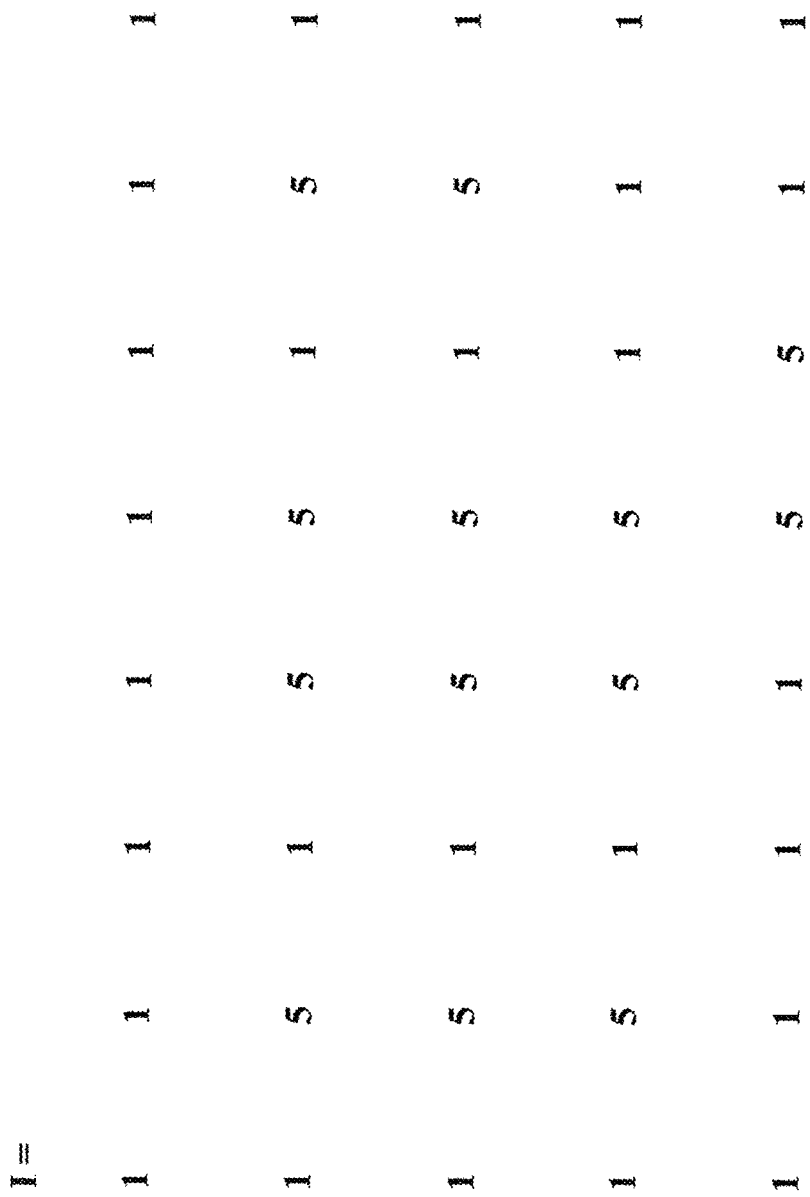
FIG. 2 is an example of a matrix of a format data type. There are many data formats and all can be used with this invention as there are simple methods to transform one data format type into another. Images and graphics are defined in digital data file formats. Currently, there are more than 44, but there are said to be 44 that are frequently used. It is better to generalize and state them as being grouped by type, so this invention covers: raster formats, pixel and Web file formats, meta/vector file formats, bitmap file formats, compression file formats, radiometric file formats (temperature and image), GIF image file formats, animation file formats, transparency file formats, interlaced and non-interlaced file formats, JPEG file formats, and progressive JPEG file formats. (This invention (FIG. 1) is not limited to only the known formats as any unknown file format can be converted to one that the process of the invention can use.) All "types" have a magnitude representation of the image and patterns it contains, and so for the purpose of this patent application, all "types" can be used. The data type in the data format may be in numerical or bit representation of shades of colors or shades of gray. Or, they can be translations of 1's and 0's (or 1's and 0's themselves) into magnitudes.

Obtain from the loaded data format (FIG. 1, 10) the graphic intensity values (FIG. 1, 11). These can be color shades, or black and white shades of intensity values of any bit length. Having the loaded file, a matrix of intensity values can now be represented as a row and column matrix as shown in FIG. 2. In FIG. 2, an example is formulated that represents a simple image intensity matrix as required by FIG. 1, 11 so that all manifolds of the image may be processed through 12 through 15, of FIG. 1, for reduction. The example created represents two images of line contour patterns, of two heights, and one image of a contour pattern, which is square.

Step 3.

Determine the minimum and maximum value of the intensities. In FIG. 2, a simple 5 by 8, pixel image simulation, is presented. Here the maximum and minimum values are 5 as the contour patterns in the image are defined by intensity values of 5. In reality, these values will be real numbers such as 5.663121234234 (as a quick example of a real number), depending on the decimal point of interest, and determined by thresholds set in FIG. 1.

Step 4.

Figure 3:
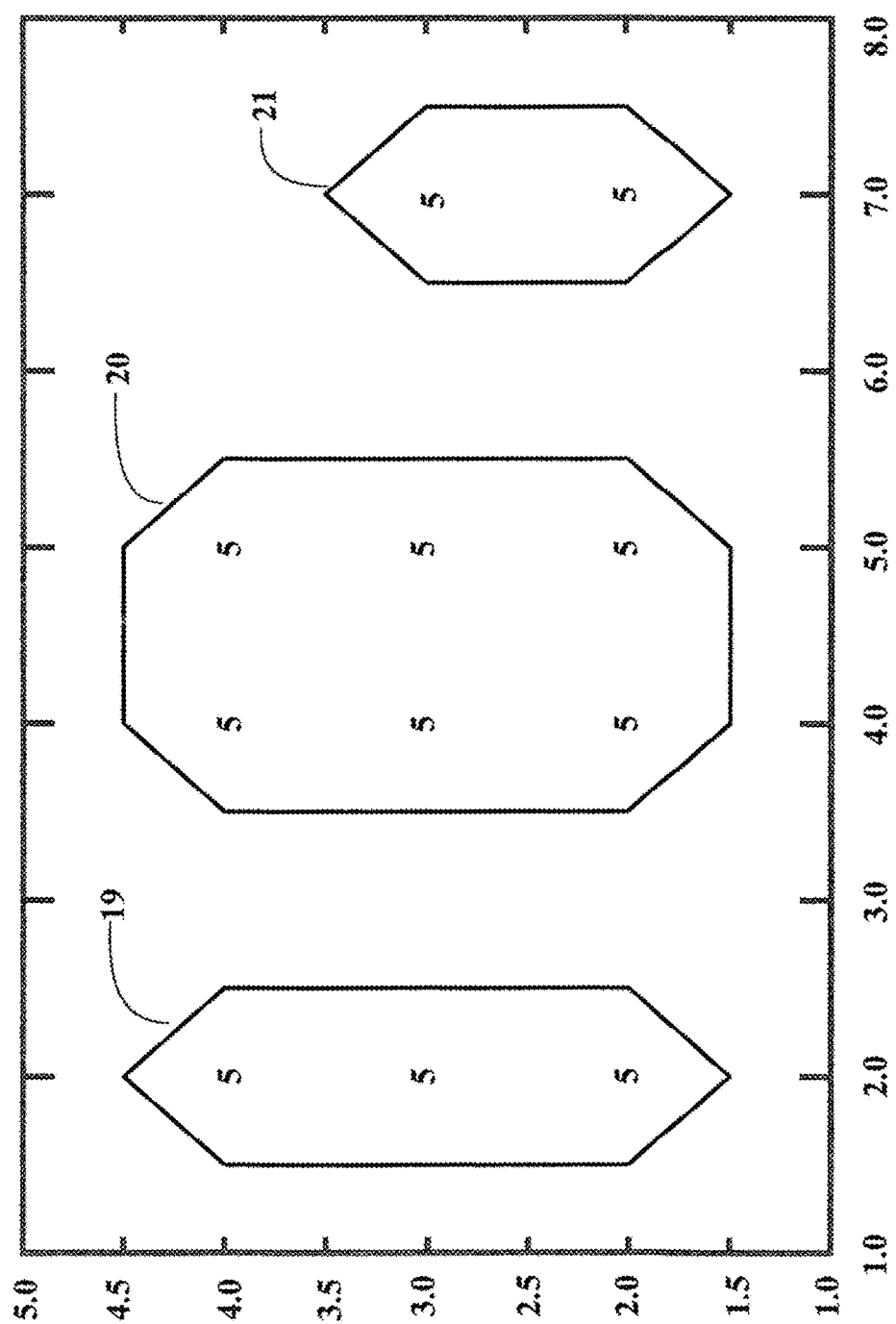
FIG. 3 is a generated display of the contour pattern metric set defined enclosure (I interchangeably refer to the contour metric set as a "manifold" as a manifold is a container, and do so to simplify writing) of three patterns: 19, 20, and 21. The combining process or contour grouping process, FIG. 1, determines these manifold patterns. In the invention, FIG. 3's results represent choice 12, and 14, of FIG. 1; that is, single manifolds are to be found.

Define the manifold, or enclose contour pattern, by a set of points that describe the boundary of the contour pattern. FIG. 3 represents the choice on one manifold ring (12 and 14 or FIG. 1). It is calculated that the distance between 1 and 5, in the matrix location space, is one-half a unit between the points in the matrix. In FIG. 3, you see three manifolds defined by 19, 20, and 21. For example, manifold 1 (19) is defined by points (x,y) as set {(2, 1.5), (1.5, 2), (1.5, 4), (2, 4.5), (2.5, 4), (2.5, 2)}. Manifold 2 (20) and 3 (21) are defined in the same manner.

Figure 4:
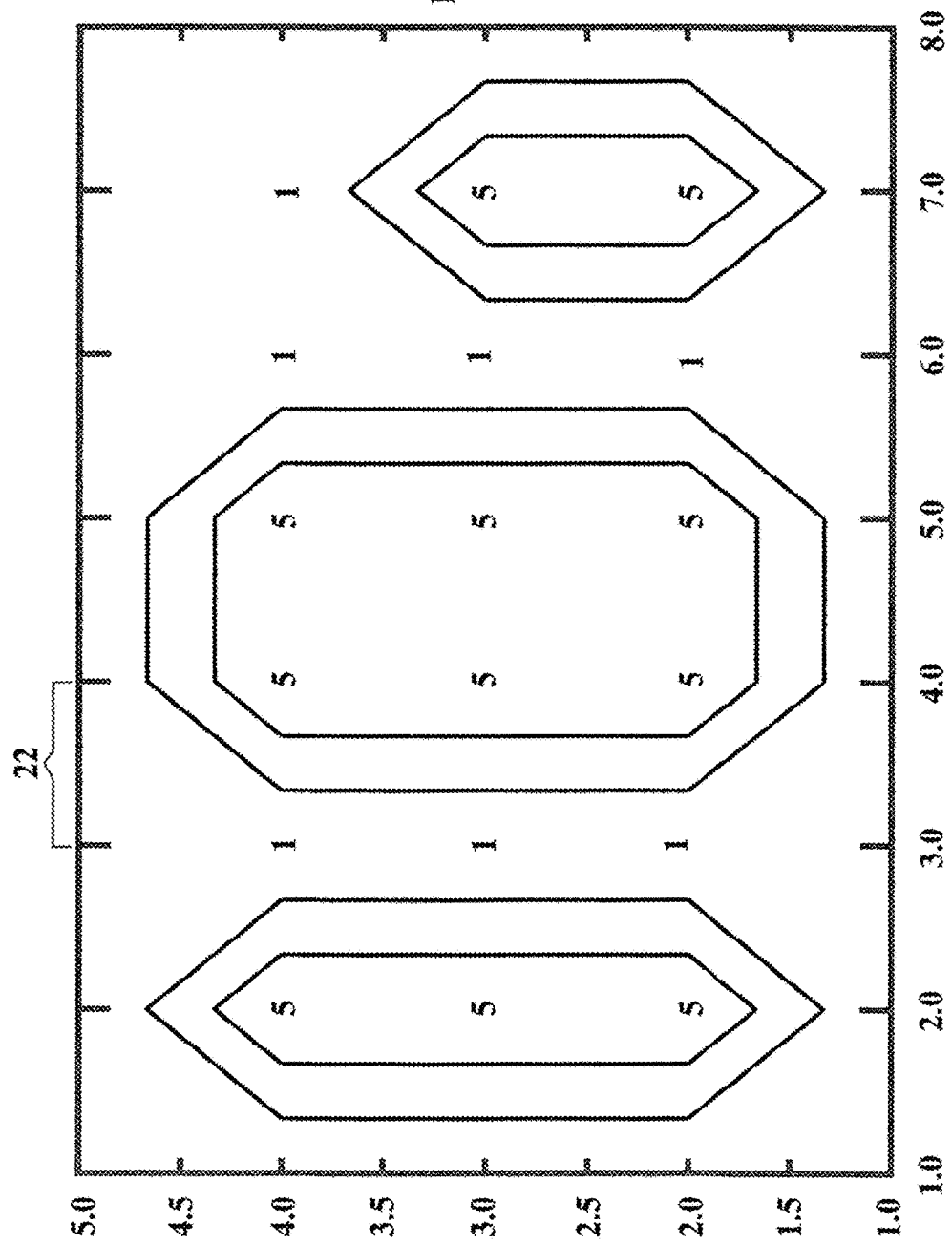
FIG. 4 is a generated display of the contour metric set defined enclosure (manifold) of three patterns. The invention determines the manifold patterns according to choices 13 and 15 in FIG. 1. For choice 13 and 15, "two" manifold patterns were chosen to identify the pattern it encloses. The locations of the divisions of the manifold patterns are determined by the amount of spacing between patterns, as shown in 22. They are equally spaced, but are not necessarily required to be equally spaced in all applications of FIG. 1.
Figure 19:
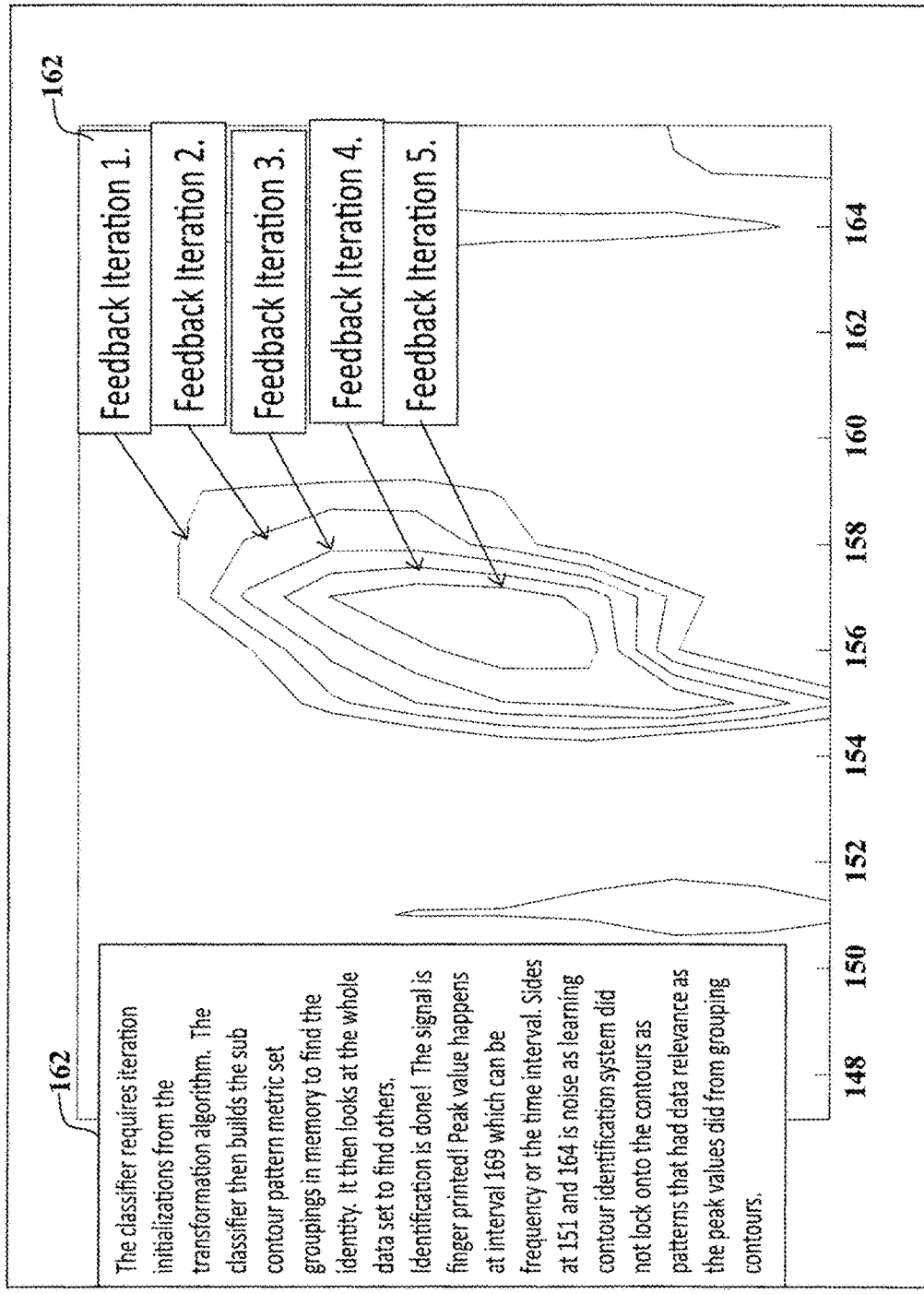
FIG. 19 is the processor instruction set showing an iterative process of how the statistics in the preferred embodiment would be used to complete the contour metric of one contour of a contour mapping of a data case. This one contour is referred to as finding the manifold, again, finding the contour pattern metric set, which is just a top level description of a contour mapping container of metrics. Item 162 is a blow up of 170 in FIG. 18. It represents the LCIS locking onto a pattern of interest created by the training FIG. 10 working with the grouping of FIG. 1 in a iteration process of locking onto the object by increasing contours within the metric container set. You are seeing five contour metrics 117 of FIG. 14 that will be used to locate the peak amplitude found between location 154 and 160 on the x-axis. This means Fourier Transforms need to be performed in similar uses, as the locations can be used as time elements as long as the image capture has a known scale. For example, that example would mean the image plug-in module would be an instrument attached to a oscilloscope which has time gradients that are known. Those gradients would be transferred to the metric as the metric is portable. This means that all that is necessary is to have the contour pattern metric stored in external memory, such as a USB drive, and simply plotting out the contours and analyzing or using a LCIS module as described in 13 do that for you autonomously. Again, there is no usage of the past file the pattern came from. The pertinent information has been retrieved, locked onto, precision increased (four contours where what optimized this before exiting), and displayed and recorded. As the peak is only of interest, all the data left can be noise, which, of course is another metric that can be used to link as well. For example, a speaker may always be in one sort of environment. If that environment is contained in the signal, it can be linked as well, but if it is not repeatable to a confusion matrix of performance values, the autonomously setup LCIS will not pattern it unless the user, through 101, of FIG. 13, decides to set auto mode to manual mode settings to operate LCIS in a controlled means that stop micro-code in steps or in process sections.

Assume that the 18, FIG. 1, preferred embodiment, claims that the manifold is consuming too much space (or area) around the contour pattern depicted by intensity value 5 (an algorithm in 18, FIG. 1, can take advantage of this ability to iterate the process of FIG. 1 (FIG. 10 and FIG. 11) by using more manifold patterns (FIG. 13 and FIG. 15, and FIG. 19) to increase identification of the contour pattern, and therefore, to create more sub-metrics identities of resulting manifolds). To reduce the space between each manifold defined ring, the space between intensity value 5 and its neighbor 1, for example, must divide the space between x-axis markers, 3 and 4 (22, FIG. 4), into more intervals. FIG. 4 and in application use, FIG. 19, shows this process result of using two manifold patterns. Take note that matrix I, FIG. 2, does not change in this process as the image file does not change. Also take note that the representation of the manifold enclosure point-set description is a division of the x and y axis, (FIG. 15 and FIG. 16) and so the manifold is "transforming intensities" to x,y-axis location values, within the matrix rows and columns.

The space between location 3 and location 4 (22), in FIG. 4, is now divided by two equal parts. The effect is the shrinking of the area around the image intensity values of 5 (FIG. 19 of action of FIG. 18), which has the effect of more closely identifying the contour pattern area (the error in area being in the resolution, or pixel spacing by increasing contours in 87 through 88 of FIG. 11). If we continue shrinking the space between the location of intensity value located at (x, y) coordinate, (2,2), and intensity value located at (x,y) coordinate, (1,2), the center manifold begins to fully enclose and reduce the manifold—reduce area, with the density within a filled manifold being minimized to a bound—of the intensity values located at (2,2), (2,3), (2,4) of 23, FIG. 5 (producing, possibly, a shape as shown in 166 and 165 of 167 of FIG. 17).

Figure 5:
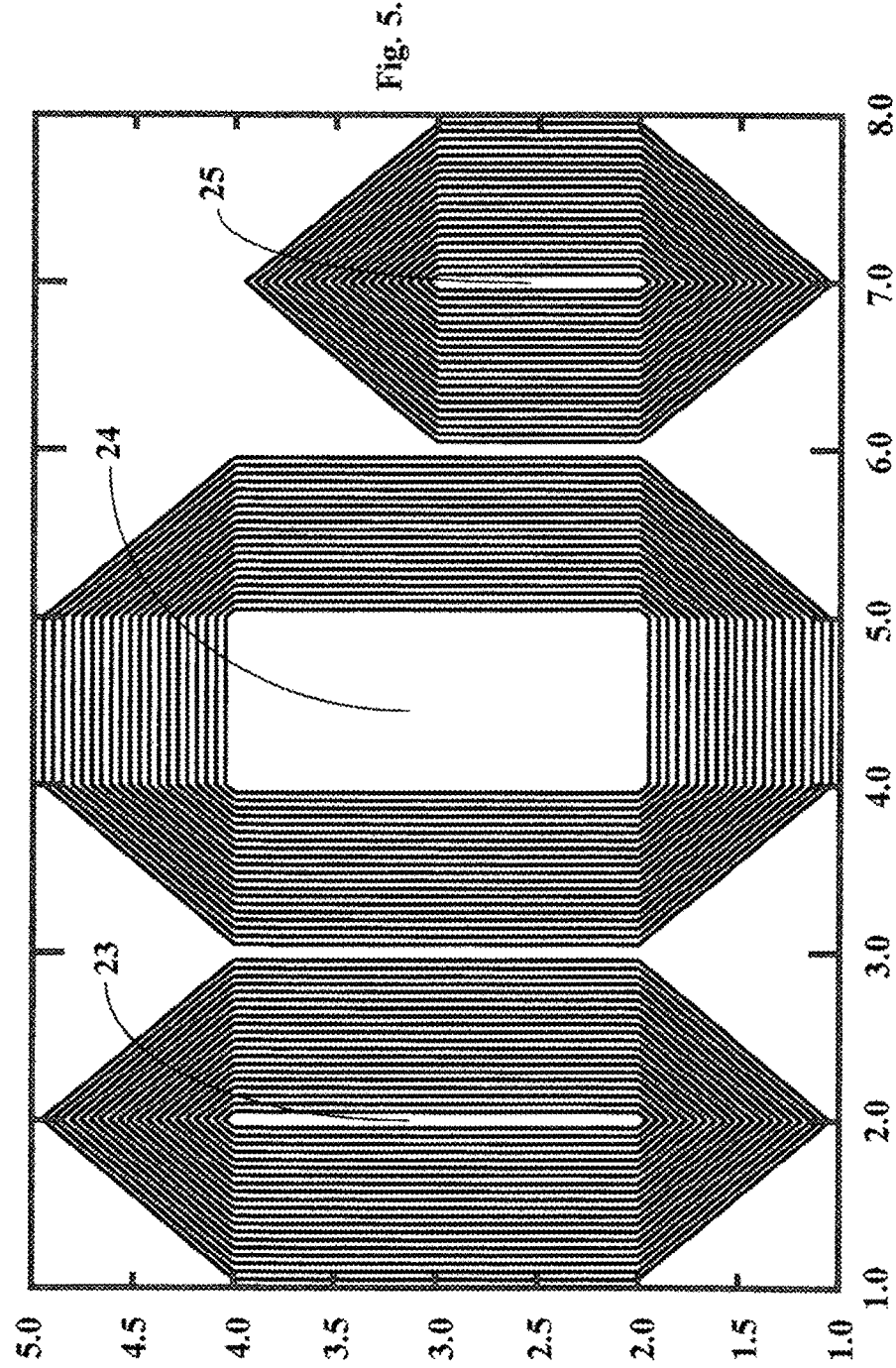
FIG. 5 is a generated display of the contour metric set defined enclosure (manifold) of three patterns. The divisions of the manifold patterns are determined by the spacing between patterns as shown in 22, FIG. 4. The invention determines the manifold patterns according to choices 13 and 15 in FIG. 1. They are equally spaced, but are not necessarily required to be equally spaced in all applications of FIG. 1.
Figure 8:
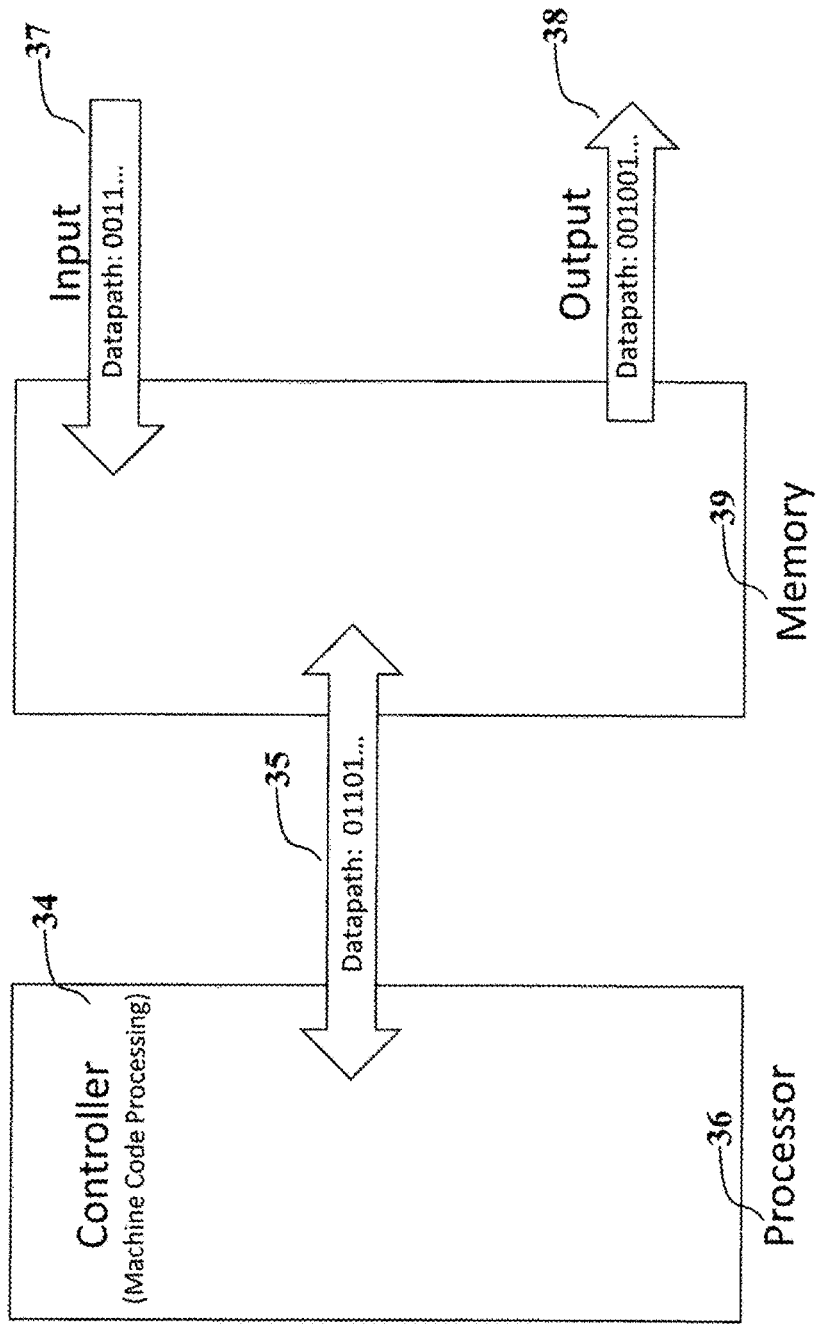
FIG. 8 is a top level description of a Learning Contour Identification System (LCIS). These are the hardware components that make up a general single LCIS system. Item 36 has a controller 34 that processes the instruction set micro code of the learning system through the datapath 37 and 38. The contour pattern metrics are stored in the 39 via the datapath 35 and are created within 36 by way of 34.
Figure 9:
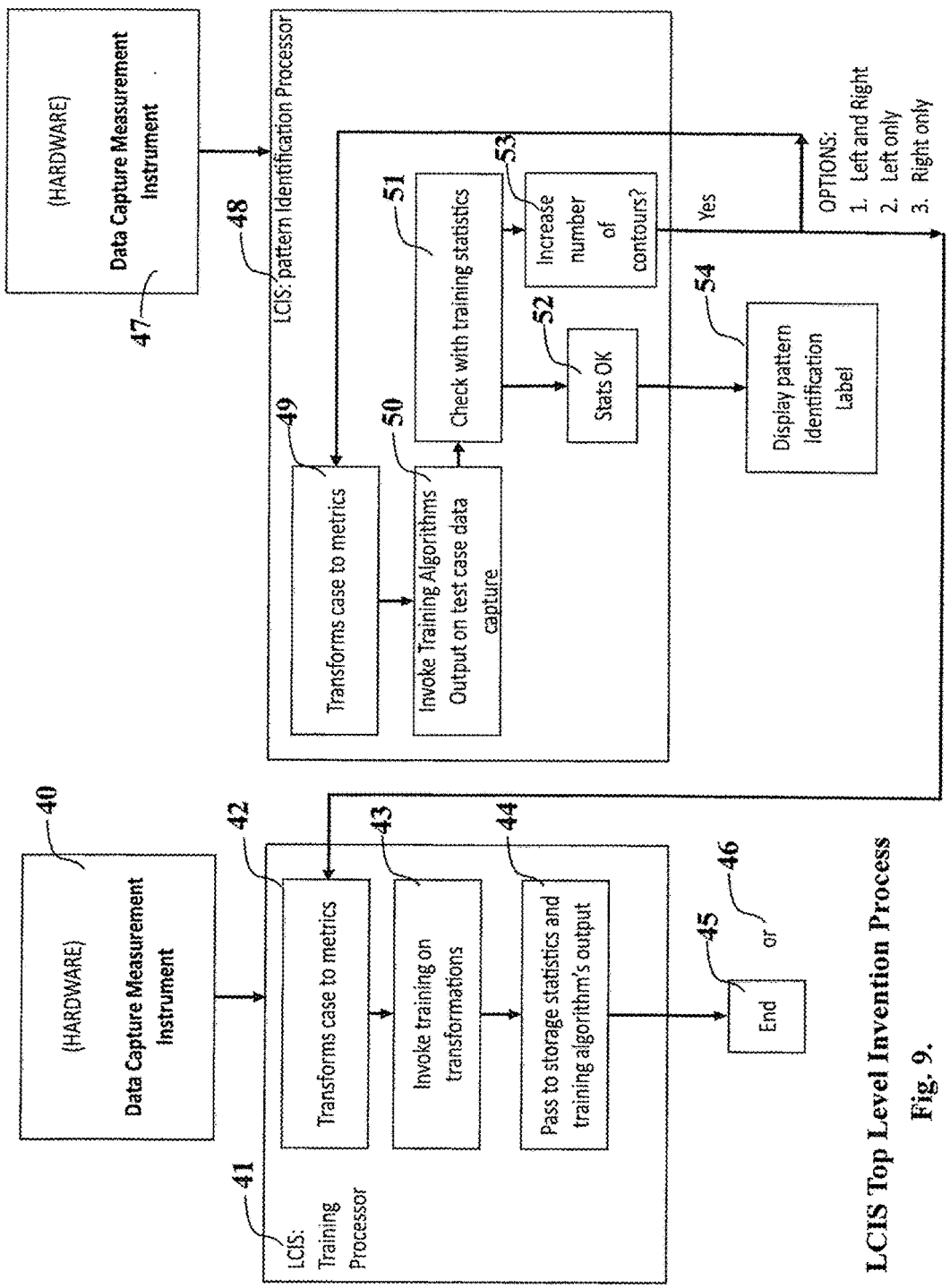
FIG. 9 is a top level description of the Learning Contour Identification system process showing a high level operation of FIG. 8. This figure introduces the system as a training processor communicating with the classifier processor. The training processor gets training case data 40, of one or more data cases, learns from the past training data 41 through 44, and sends the output 45 generated by the training processor to the pattern identification processor 48 where 47 retrieves test cases and determines from 45, by way of 49 through 53, iterations of 41 and 48, until the LCIS displays the output 54 and stops. Options to increase contours in training, training and classification, classification only, are determined by user and by confusion matrix outputs processed by the LCIS system.
Figure 16:
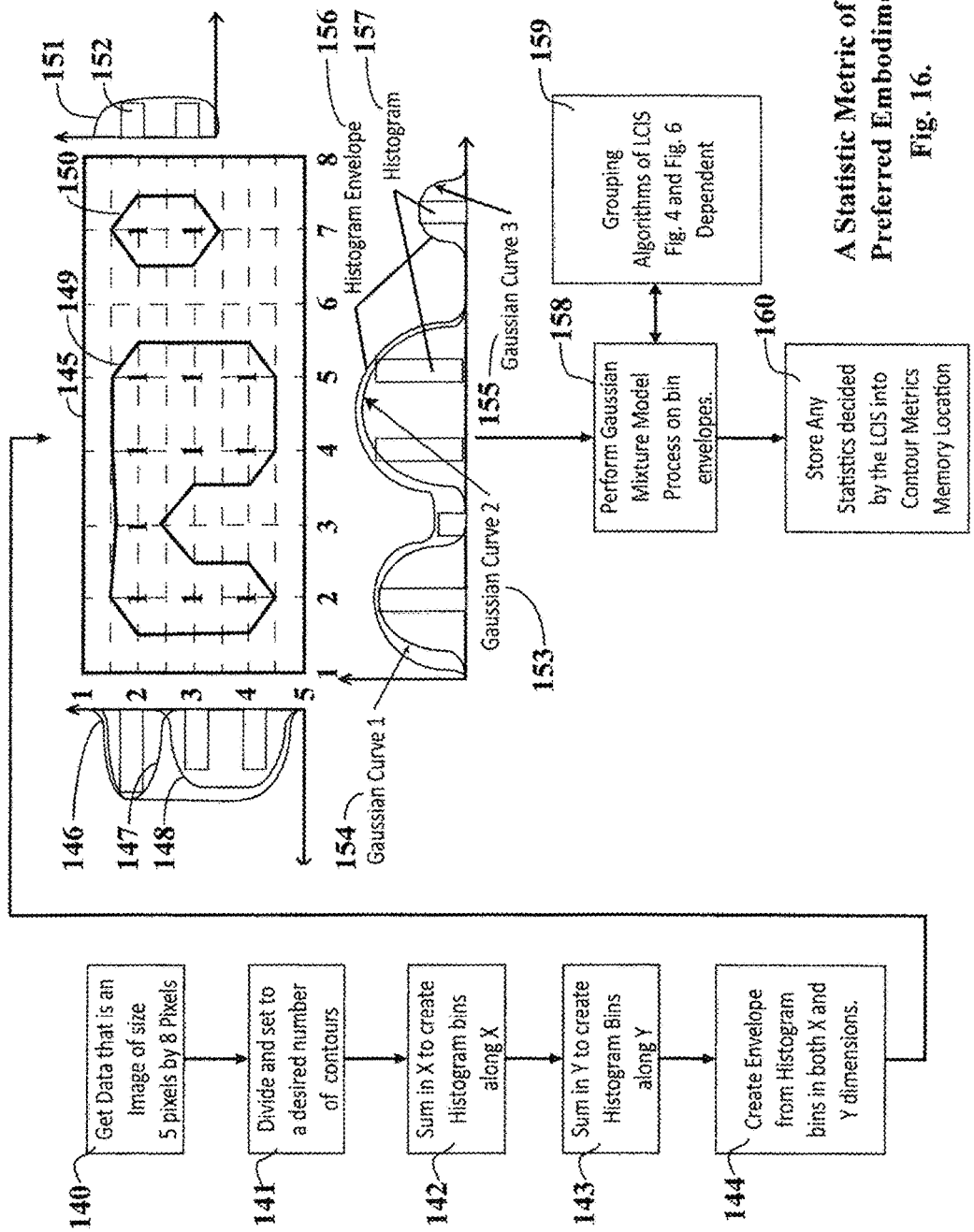
FIG. 16 is another low level description of the contour mapping micro code instruction set of the LCIS. This figure represents an example of the statistic metric, which is really just an example of 116 in FIG. 14 shown as a preferred embodiment of a contour pattern metric when the training is a Classification and Regression Tree rule-based training micro-code set. The contour pattern metric set of coordinate point sets are described by 149 and 150. The fillers of 1's are place in the contours of each. These can be weighted unity fillers. Then, the sums along the x and y axis give the histogram bins of 152 and 157, having histogram envelops 156 and 146. The Gaussian Mixture Model components then are possibly 154, 153, and 155 as well as 147 and 148, and 151. The mean and variances represent the location and variance of each of these components. As Gaussian Mixture Model components can be added or subtracted, learning may add 154 to an entirely different set of components from an entirely different contour metric to identify more precisely the contour pattern to be classified. This means that the LCIS system finds micro patterns and records them for future use and which no other state of the art program can do. And, the result is portable meaning at any time the pattern can be recreated from the metric without ever needing the photo again.

FIG. 5 is used to show multiple iterations of dividing the region up into 20 manifold patterns; that is, for manifold 1 (23), 2 (24), and 3 (25), 20 metrics representation sets (as given in 18, FIG. 1) have been created (again, best shown by FIG. 19 through FIGS. 8 through 16). Again, matrix I, in FIG. 2, will not change. Invention described in FIG. 1, is just dividing up the space between the intervals 3 and 4 so that more patterns of manifolds can identify the contour pattern at location 23, 24 and 25 (FIG. 5), or to reduce the area of the contour pattern manifold to a closer approximation of the contour pattern area space. However, it is important to note that the fill of the resulting manifold reduces the "area" to a more accurate description of the contour pattern and it also determines the minimum "density" of the contour pattern (more on this below). These density values are important in manifold fills (145 of FIG. 16), as a minimum probability density curve will be considered, and proved (FIG. 10 and FIG. 11), to be the lower bound of the contour pattern the manifold metrics representation represents.

Step 5.

The desire may be to throw out, from consideration, all manifold patterns but the center patterns of FIG. 5 (23, 24, 25) (example would be to throw out contour pattern metrics sets of FIG. 18 having less pattern rings than given in, say, FIG. 19). This leaves only the center pattern manifold metrics coordinate point-to-point representation for the fully defined manifold and therefore, could represent a "point area" of metrics classification (116 of FIG. 14) of the contour pattern to any application using the manifold created by FIG. 1 and FIGS. 8 through 16. That is, in FIG. 5, then, four manifolds (the three center patterns, and the background of 1's.) would then have been created for use in an application instead of 61 manifolds (3 times 20 manifolds plus one background equals 61). This reduces computational complexities for algorithms using the benefits of manifold creation and it is all determined by FIGS. 10 and 11 through FIG. 13. For these center patterns, then, it can be said that the manifold resulting from the detected contour patterns will approach the exact shape (increasing identification accuracy in FIG. 11) shape of the contour pattern as the number of divisions approach infinity—in this example, then, to the pixel level (or to the data format levels limits) of the data format type, as given in Step 1.

As it is shown in Step 4, the points completely defining the center ring are calculated by FIG. 1 and the LCI process of FIG. 13 made up from FIGS. 8 through 16, and as the divisions are proportionally spaced (although not necessarily), the divisions take place at a known point of reference in the matrix (not in the intensity values), creating the transformation of intensity values to an contour pattern location value. It is important to note that all manifolds, in this example, are all are treated in the same way in the coding of all manifold points to be represented by the matrix (FIG. 14). This implies that a closed manifold can enclose a contour pattern that has little area, that is a "line," or "point," in any file format. Therefore, manifold accuracy is defined, approximately, by the pixel width and height of the data format used in Step 1. Again, to verify the claim to this ability, visit the manifolds in FIG. 5. There, both manifolds found, and described by points of the manifold, have an enclosed manifold of a line of area basically defined by stacks of pixel resolution widths (see manifold 1 (23) and Manifold 3 (25) of FIG. 5).

FIG. 5 also shows that the process of invention LCIS can describe a depth (density) or area, as described in manifold 2's square contour pattern (FIG. 5, 24).

If the manifolds are filled (part 2, of 18, FIG. 1) with ones (replacing all intensity value locations in FIG. 2, with the value 1; remembering, the manifold leaves the data set so the background of 1's do not interfere as the manifold is defined already), the density of 23, in FIG. 5 would be calculated from a single histogram stack height of 3 along the x-axis, and 1 and 1 and 1, in the y-axis. For 24, in FIG. 5, the density would be 3 and 3 for the x-axis, and 2, and 2, and 2 for the y-axis. For 25, in FIG. 5, the density would be 2 in the x-axis, and 1 and 1, in the y-axis. In a real image (145 through 155 in FIG. 16), these densities are likely to form a histogram distribution similar to what is described by the Central Limit Theorem, which is normal, or Gaussian. Also, using splines, more points around the contour pattern can be created, and then scaled to give an entirely new density (can store as another metric by the LCIS as 116 in FIG. 14). Also, take note that the fill does not have to be 1's, it can be a weighted value times one, called unity weighting, if the user wants to give more meaning to area. In fact, the density fill, does not even have to represent a density. It is an identifier, after all, nothing more, but it is best as a density as it has Statistical meaning.

In FIG. 3 through FIG. 5, the values of intensity represent each of the contour patterns as the values come from the format of the digital file. In the case of FIGS. 3 through 5, there are two contour patterns that represent "lines", and one contour pattern that represent a "square". Another embodiment is to combine a manifold of different contour patterns using the same technique described above, but which now take advantage of combinations of two or more contours (84 of FIG. 11, or 83 through 87 of FIG. 11 with FIG. 10 to assist in FIG. 13). For example, in using FIG. 1's 12 through 15 choices, combinations of manifolds can be created to create another manifold metrics expression.

Figure 6:
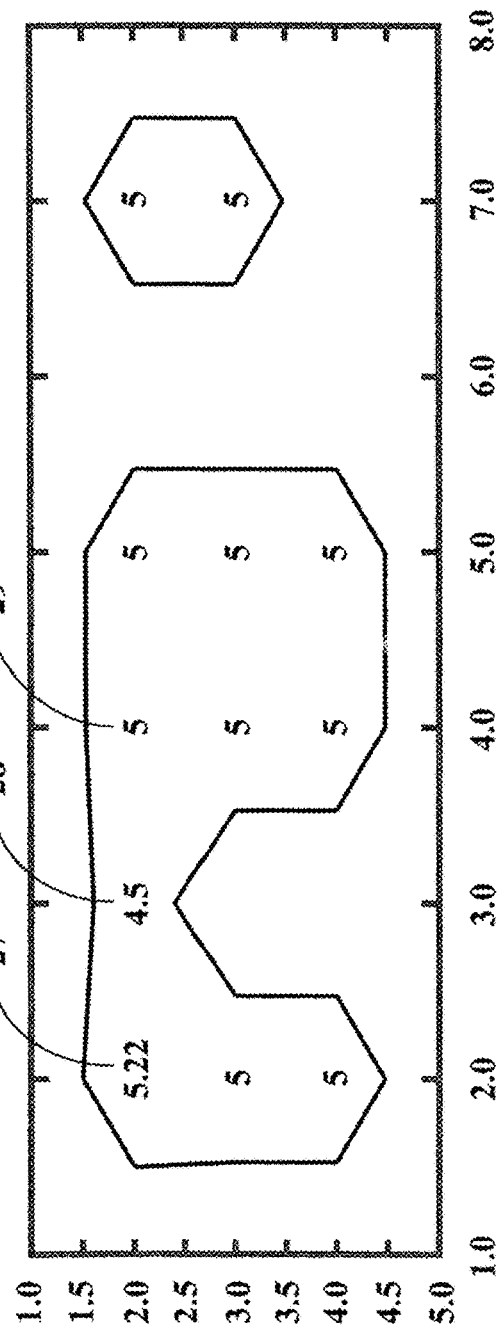
FIG. 6 is a generated display of the contour metric set defined enclosure (manifold) of two patterns. This figure uses another matrix to show that choice 13 and 14 are used in invention FIG. 1. The range of pattern values grouped is 4.5 to 5.22 which is determined by the number of contours desired and set within the learning contour identification system hardware. There are three possible pattern classifications as defined by intensities 26, 27, and 28, but there are two pattern manifolds selected by FIG. 1.

In FIG. 6, I, in FIG. 2, will be redefined to include different intensity values to indicate four totally different contour pattern manifolds that are available to FIG. 1. Each value added is now a real number, rather than an integer of 5, to indicate that ranges can be chosen by rounding methods of real numbers; that is, precision is being controlled by manifold selections.

In FIG. 6, the process was given a threshold in FIG. 1. The threshold is to combine groups of contour patterns in intensity range 4.5 to 5.22 (122 through 130 of FIG. 15). The contour patterns in this set are now defined by 11, of FIG. 1, to be set {1, 5, 4.5, 5.22}. The threshold of spacing stayed at one to isolate the two contour patterns from one another. Manifold 1, for a quick example, is defined (by 18, FIG. 1) by y-axis points {2, 2.4725, 2.4725, 3, 3.5275, 3.5275, 4, 5, 5.4725, 5.4725, 5.4725, 5, 4, 3, 2, 1.5, 1.5275, 1.5275, 2} and Manifold 2 is defined by set points {2, 1.5, 1.5275, 1.5275, 2}. The x-axis is simple as well. An pattern of the points (or smoothing using spline mathematics to interpolate more points, for example) going through these points would represent the metric of the manifold enclosing the contour pattern of interest (139 of FIG. 15 and 113 of FIG. 14).

The value of contour pattern intensity 1, is, the background, which is decided to be a shell of the contour patterns contained in the whole image. The image resulting from subtraction of the individual manifolds created by FIG. 1, would represent cookie cutter remnants that would generally be defined as noise, or information of no interest (the single contours found in FIG. 18). This noise, through manifold filling, and density calculation's from the fill, can still be valuable to an algorithm needing to adjust to the noise intensity of the image. This is very important for Statistical, Feedback, Classification, Machine Language trained algorithms (or combinations of) as removing noise from the contour pattern can be very valuable as seen in the FIG. 7, FIG. 8, and FIG. 9's results of FIG. 1. Noise is not thrown out, and does have uses so it's manifold, point-to-point, and metrics representation (117 of FIG. 14), is of importance just as the intensity values are, especially in multi-speaker identification uses that was used in finding the result shown in FIG. 18.

It is clear by FIG. 6's final calculation of manifold values (example of y-axis values {2, 2.4725, 2.4725, 3, 3.5275, 3.5275, 4, 5, 5.4725, 5.4725, 5.4725, 5, 4, 3, 2, 1.5, 1.5275, 1.5275, 2}) that the points defining the contour pattern (113 of FIG. 14) do not indicate the magnitude values of 5, or 1. The points are instead, intensity to matrix location, "transformations" of FIG. 1's final 16 and 17's processes. That is, they are simply division's point locations of the separations between intensity values in the matrix (124, 126 and 129 of FIG. 15). They represent single or combined groups, of separation change values, from intensity pixel, to manifold wall (FIG. 1, and 64 of FIG. 10, and 83 through 87 of FIG. 11, and FIG. 12). If it was desired, a choice of 13 and 15, in FIG. 1's process, can process another threshold that makes manifold 1 and 2, in FIG. 6, one contour pattern, as well.

Combining contour patterns in this fashion creates subcode manifold densities (117 of FIG. 14) that can be used for classification algorithm analysis. The beauty of process 10 through 17 is that no changing to the process machine code is required for the finding of the manifolds, for LCIS systems that wish to use it in processing (18, FIG. 1). The benefits of FIG. 1 are that combinations of Statistical Analysis routines, feedback, classification, and learning contour identification, would not be possible if it were not for FIG. 1, FIG. 13, and FIG. 14 (of course other figures in support of these as well). Computational complexities in today's current technology do not allow for the removal of the contour pattern identified in the image, as they find no need to create a metrics identity to the contour pattern it defines. This defines the novelty of the learning contour identification processes. It finds all contour patterns down to a single intensity point, and represents it by an area that is transformed through manifold filling, to a probability density value representation, and area, a location, and an metric container (FIG. 14) that can be changed in shape like a balloon; that is, the points (113 FIG. 14) represent an area and any area defined metrics can be changed into another shape having the same area like a squeezed balloon. All this is done in terms of defining the manifold by a metrics of information FIG. 14.

Step 6:

Finally, Steps 1 through 5 perform the steps of finding all contour patterns within the image. Step 5 takes advantages of thresholds to define groups of contour patterns if the user, the classifier, the feedback system, or the statistical analysis, or combinations of, desires. Step 5 allows the operator, or process of 18, FIG. 1, to determine a range of divisions that one desires (See Step 4) between the locations of the contour patterns (122 through 138 of FIG. 15 and 140 through 160 of FIG. 16). It is a simple weighting of the divisions of the spaces as shown by the gradients in the figure. This step, Step 6, then, is to take advantage of the transformation of contour pattern shape, to a metrics representation that is of set (18, FIG. 1) {probability density, area, x-axis location, y-axis location, sub-areas, sub-densities, sub-axis locations, and sub-y locations} and store as appropriate in 113 through 117 of FIG. 14.

One performed embodiment of FIG. 1 is to locate cancer cells. FIG. 17, represents a source file of cancer cells taken by microscope, and then placed in a digital image file container that is TIF. FIG. 17, 161 through 163, is used to identify and remove from the environment a set of points that cannot only be plotted on an x-y axis, but can be used in a classification, feedback, statistical adaptive process by way of the manifold code that is linked to 165 and 166, emphatically. FIG. 1 and FIGS. 8 through 16 created the image outlined in 165 and 166, but to greater detail than just an outline of the image, and as two manifolds that reproduced the exact shape, but chose portions of the original that more clearly link the cell to exactly the one of interest which is that found in complete form, than half removed from the image (161). Filling this manifold, then, lead to very detailed density, statistical representation of the EXACT type of cancer and can therefore be used in tracking algorithms that use the main embodiment algorithm of GMM, Machine Learning, Decision Trees, and Adaptive feedback systems. This analysis is an actual implementation of the said process and LCIS use of FIG. 1 and FIGS. 8 through 16.

Another embodiment is that of signal waveform analysis, common in communication signal systems, security communications system, electromagnetic wave receiver systems, encryption systems, and so on. FIG. 1 is used in FIG. 18 to show that a signal in noise is detected. Although not shown in FIG. 18, a complete description of the noise envelope was also found by 18, of FIG. 1 executed through FIGS. 8 through 16. It is the lighter shade surrounding the signal in 171. The process in 18, of FIG. 1, is that of creating a manifold to use in a GMM analysis, to be then classified by decision trees. The decision trees are built from the Gaussian Mixtures of mean and variances which have been determined from the filling of each manifold FIG. 1 created and demonstrated in 145 through 155 of FIG. 16. This is why there are multiple patterns on the peaks, and single manifold patterns on the noise in the background; that is, detection was found and adaption to the contour pattern finding was now happening (64 FIG. 10 and FIG. 11). Basically, the GMM uses the density calculations of the filling created in FIG. 1, 18 to determine if the manifold has Gaussian distributed data in x and/or y-axes. The next step, determined from the learning, is if there are other created manifolds that are indeed the contour pattern of interest in the training set. If there are not, the process stops, if there are, it continues to adapt to the manifold patterns (or count the manifold patterns would be an alternative use: FIG. 5 and FIG. 18). Regardless, these actions are used to change the threshold in FIG. 1's 12-15 decisions and are a direct result of a learning contour identification system trained to past data (FIG. 10); also determined by a feedback process (FIG. 11) (that is, adaptive processes tied to classification that change the threshold through multiple iterations of FIG. 1)

Although there are many application uses of the processes described by these figures, as the outcome is entirely metrics and removed from the source, there are no changes necessary to FIG. 1's process in any of its uses as they are used in these figures. In fact, this is especially so of the use of LCIS, Statistical Analysis, and feedback, classification system processes that is using FIG. 1's manifold creation process. This particular process (FIG. 1, 18) proves so successful using the manifold's metrics findings, 18, in FIG. 1, can even be used to locate a line of unit one, pixel, thickness. FIG. 7 is an example of this capability.

The thermal image in FIG. 7, 30 shows the radiation pattern picked up by the hardware device that stored the image as a radiometric data format. FIG. 7, 32, shows that through Statistical Analysis, feedback, classification, and re-processing the contour pattern metrics of FIG. 14, created by FIG. 1 and iterations of FIGS. 8 through 16, each time, reduced 19200 possible point set metrics that are disconnected to 4044 point set metrics that give a contour of exactly that which is a true pattern of interest. Then, through the feedback, classification, statistical analysis processing of density values and areas, the LCIS of FIGS. 8 and 13, created the image of 33, in FIG. 7. This image in 33 is one manifold stream of data points output by the display device 110 of FIG. 13, by 101 application module LCIS of FIG. 13. To a classification system, the density of this final manifold is then stored away from the data set it was taken from (111 in FIG. 14 stored as a file format necessary for the user of 101 in 13). Now, not only can Machine Learning take advantage of the density, areas, and x,y-axis locations, that are assigned to this end result, but it can also take advantage of its sub-level manifolds in 32 of FIG. 7. The result, then, is a complete fingerprinting of the chain. If the user wishes, many levels of sub-density values to 33, each iteration of the manifold(s), in the feedback/classification process, can be stored and linked to this final manifold representation of the image. If a tree classification system is used, it is clear that procedures like Gini Indexes in Classification and Regression Tree algorithms can be completely replaced by actual probability distribution values of the contour pattern metrics themselves.

The system of the process just described begins with a background of the components. The LCIS, of FIG. 8, and FIG. 13 are now discussed.

Figure 10:
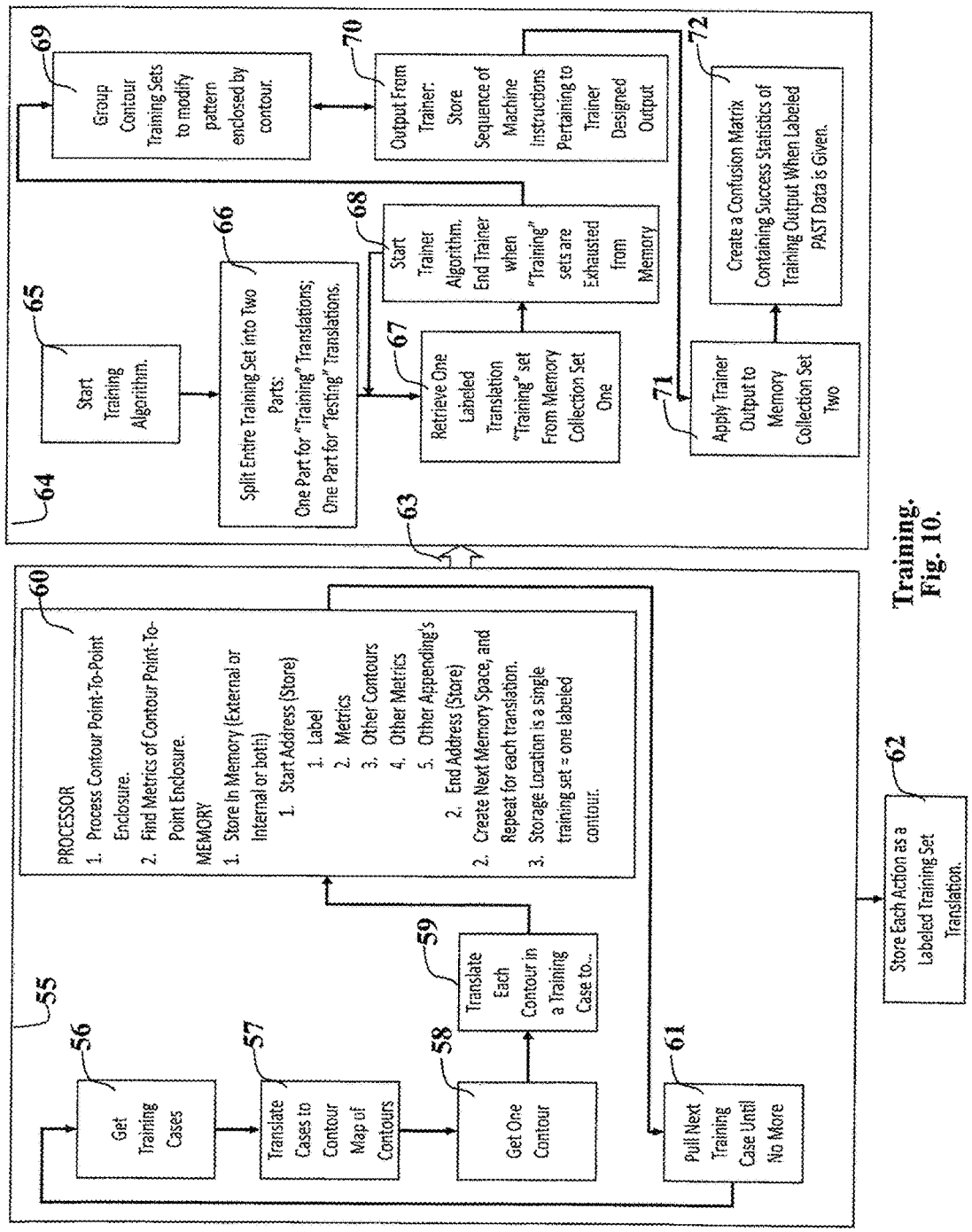
FIG. 10 is a low-level description of the training processor, 55 and 64, and instruction set micro code, 56 through 61. Training case data is captured 56, transformed into contour metrics, 57 through 60 and 62, set to training, 63, trained on in 65 through 72, where the training module prepares the output to be sent to the contour pattern identifier, 72 and 62.
Figure 11:
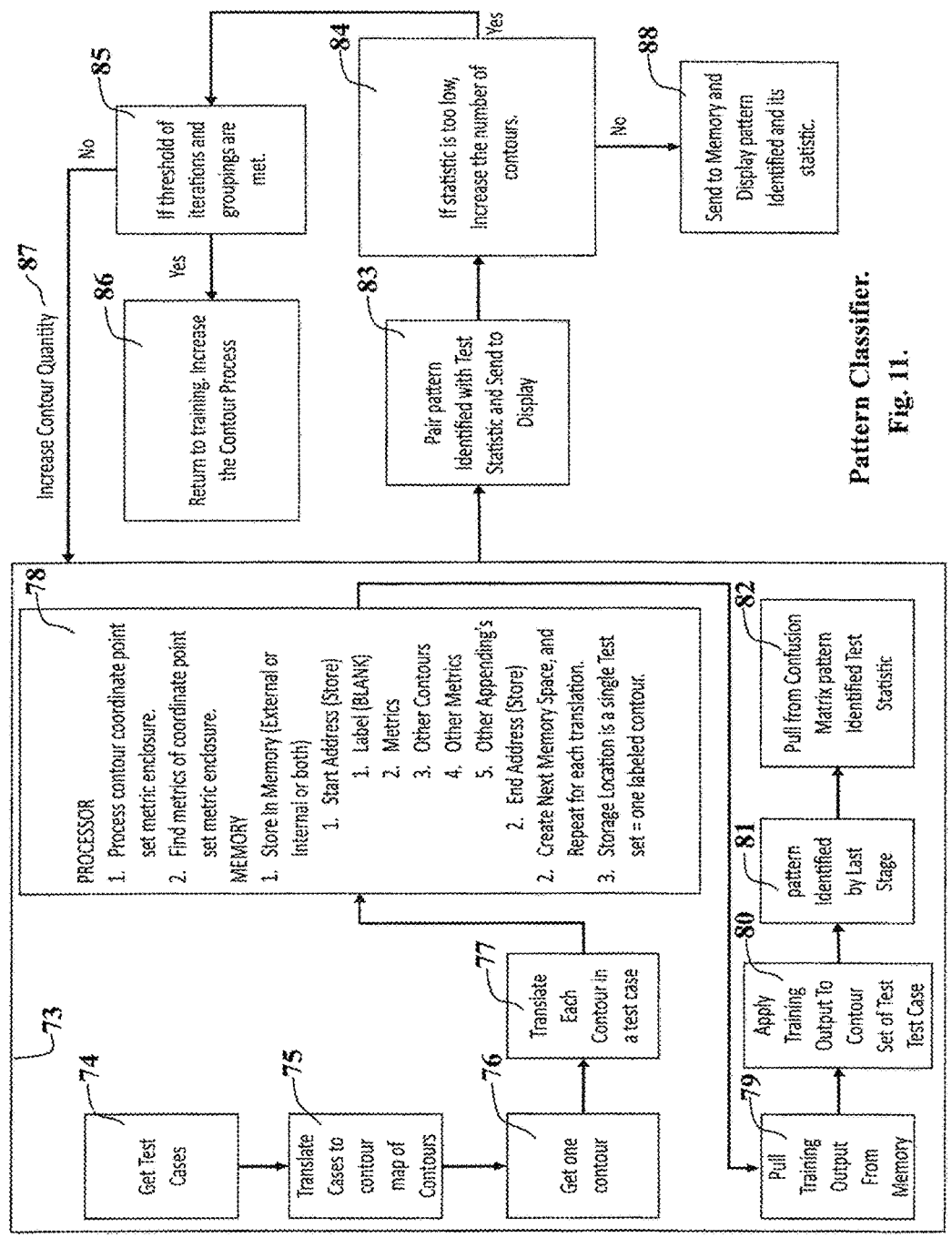
FIG. 11 is a low-level description of the test case contour pattern metric set classifier processor, 73, and instruction set micro code, 75 through 82 and 83 through 88. Test case data is captured, 75, transformed into contour metrics, 75 through 78, training black box or training rule-set code pulled in 79 and applied to contour metric in 80 achieving contour pattern identification in 81 and compared to trainings confusion matrix in 82. If the statistics found in 82 are too low in 83, 84 and 85, then it returns to training to increase the contours and re-run FIG. 10. But if the threshold is still met, then only increase the contours in the classifier 87, and repeat classifier. Once the classification is found to be as optimized to past data statistics as defined by the confusion matrix found by the training process, the output is sent to memory 88 and displayed.
Figure 12:
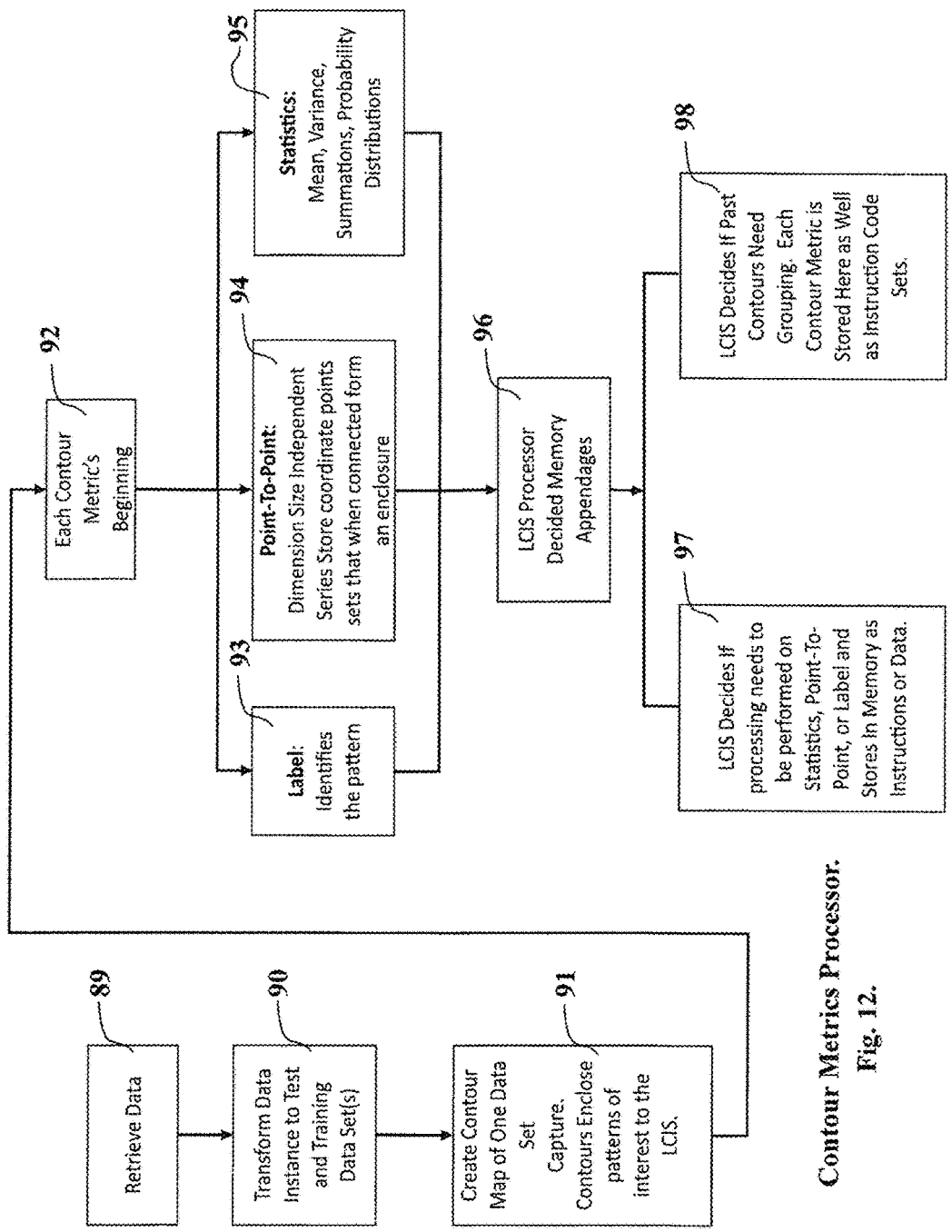
FIG. 12 is the low-level flow diagram of the contour pattern metrics processor's instruction micro cod set 89 through 98. Here it can be seen that the preferred embodiment of the basic contour metric, or manifold as a container of all contour metric sets. A contour pattern metric set, or manifold for short, for the preferred embodiment contains at least a label 93, a coordinate point sets 94, and statistic metric 95. The LCIS determines if other metrics are desired by the training module in 96 through 98.
Figure 15A:
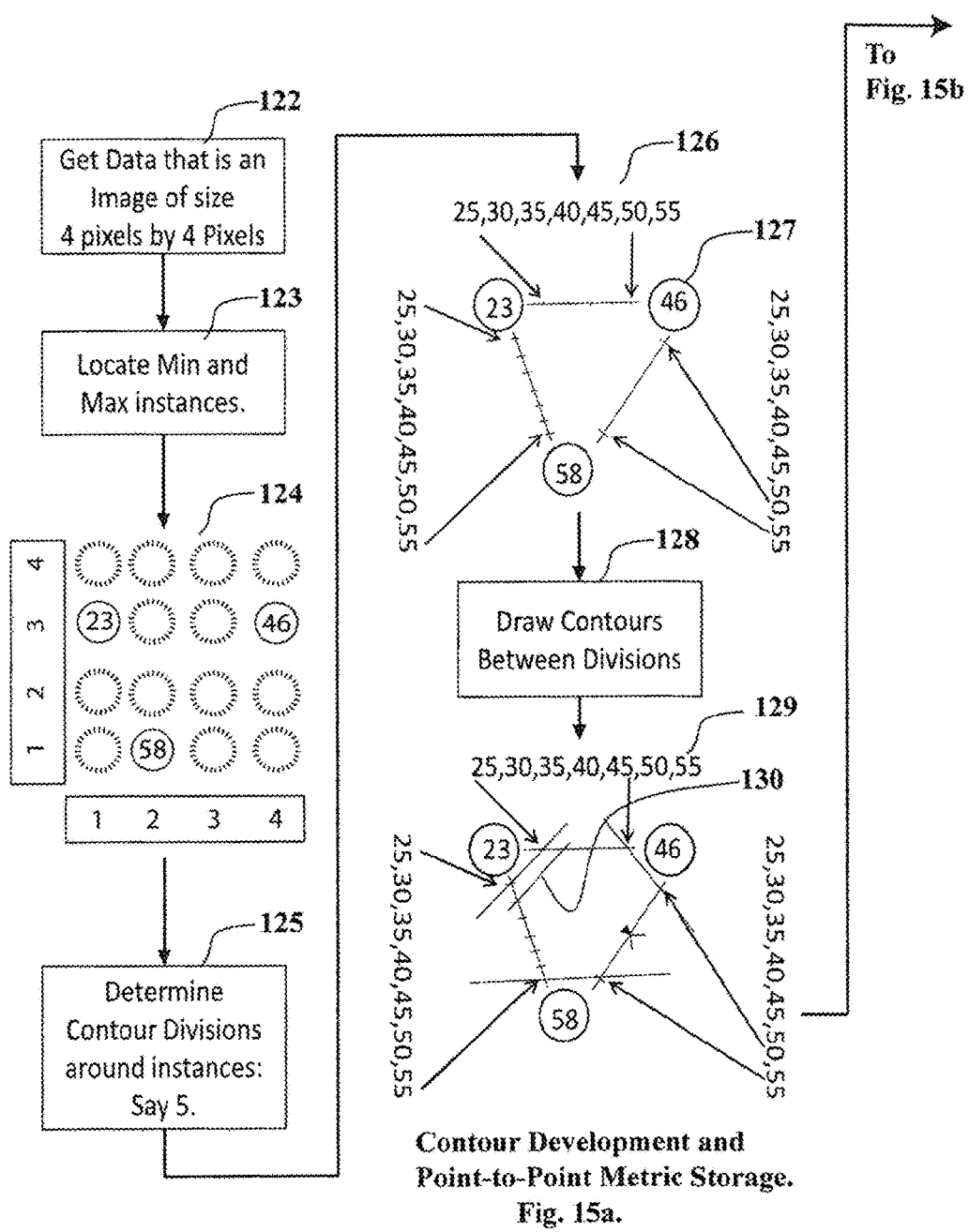
FIG. 15 is another low level description of the contour mapping micro code instruction set of the LCIS. The figure is a simple example demonstration of how a contour may be developed. The example starts with making up a 4 by 4 matrix of pixel intensities. It finds minimum and maximums in 123 and 124 and reads the number of contours the system wants, and divides the shortest distance between these areas in equal intervals of 5, for example in 126 and 127. Then the contours are connecting point between the divisions like 25 to 25, or 55 to 55. A more detailed example can be grouping the ranges of intensities as was seen in FIG. 6 where the range was between 4 and 6, essentially. Item 136 shows how a two contour pattern metric point set is created in 139. The contents in 139 is that metric information stored as 113 in FIG. 14.
Figure 15B:
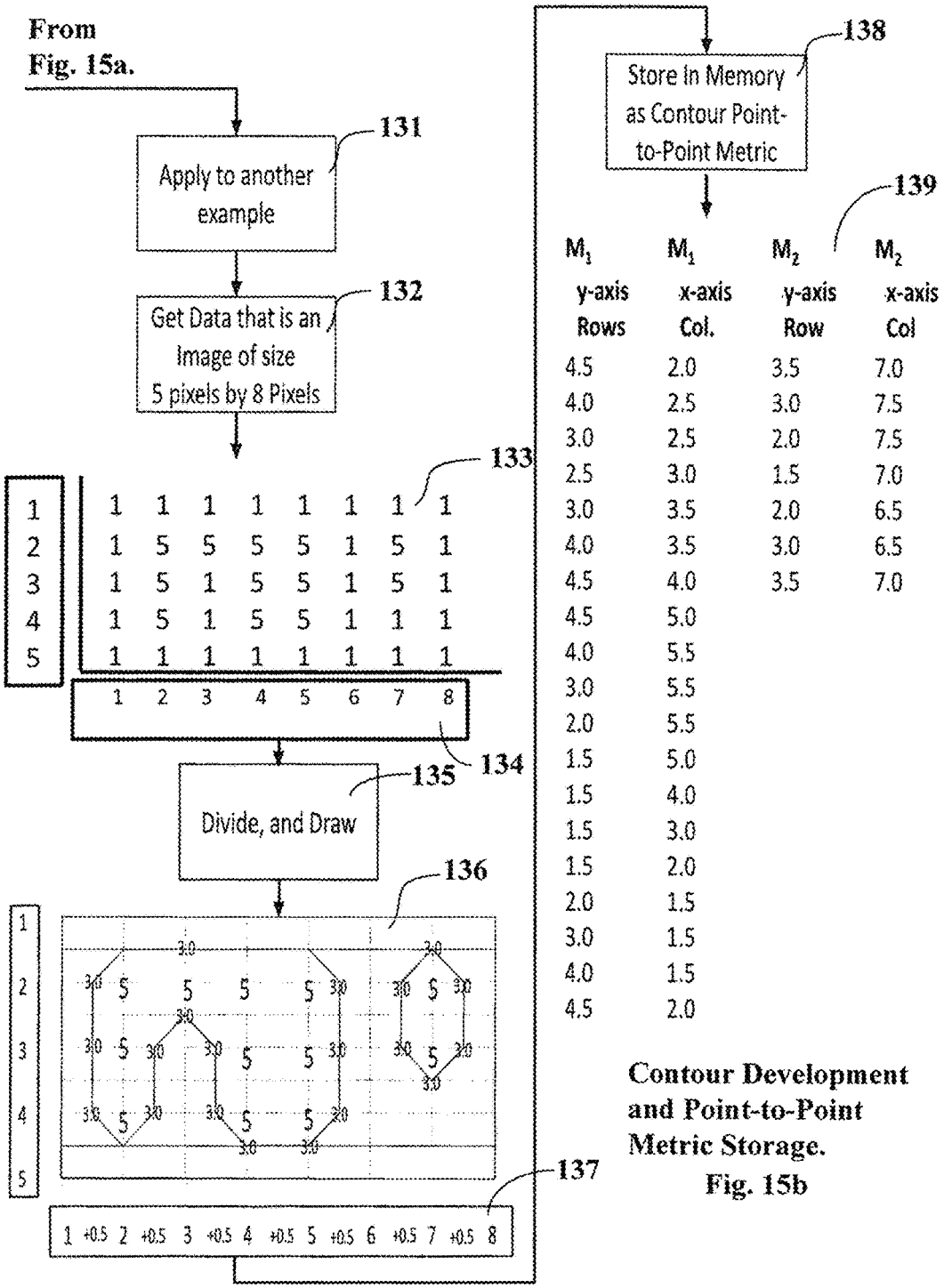

Learning is a process that uses statistical methods to create learning techniques whose processes are single or multiple iterations of execution of machine language coded algorithms (55 through 72 of FIG. 10). As a system (FIG. 8 and FIG. 13), as described herein, it is a learning object identification system (LOIS) where these coded algorithms are processes which take information from memory stored data sets (39 of FIG. 8), of past events called the training set (56 of FIG. 10), learn trends and patterns from this information (FIG. 10. 65 through 72), and then apply what has been learned to finalize an output of a new data set (74, of FIG. 11), generally termed the test data. The step preceding the final process of the LOIS is generally to identify an unknown event (88 of FIG. 11), or the object of the test data, by applying to the data the learned trends from the training set. The final process of the LOIS is to classify, store in memory, and display the outcome, which is to say, to label the outcome as some object of interest. Common terms used to describe such systems are those which encompass field interests of Machine Learning and Artificial Intelligence research.

The LOIS system generally consists of five components and its firmware or system(s) software (items 34 through 39 of FIG. 8). A processor gets instructions and data from memory using a system's data path. The input block writes the data to memory and the output block reads data from memory for the purpose of displaying, or to be further analyzed by another LOIS. The control block (34) sends the signals that determine the operations of the data path (35), the memory, input and output blocks, 37, and 38. The control then sends the data back to memory, and to a display device (110, FIG. 13). The processor contains the controller and has a data path to memory. The system is controlled by binary machine language program processes which can be transformed into a higher level called the assembly language program, or even further, to a high level language that is user and application development friendly. In all cases the coding is the process that makes the system work in unison with parallel or serial versions of the same LOIS systems. This implies that a system can contain blocks of other systems each having exactly the same set of hardware components (100 through 110 of FIG. 13), each performing a different action, or a process in unison to benefit one or many of the other blocks that may be serially or parallel designed into said system. This is defined herein as grouping of systems or a grouping of independent processes having their own basic assortment of controllers, memory, input and output, and data paths.

Generally, input data format changes occur in the processor of the system and does so for the purpose of controlling another processor in the system. This is done so that the sequence of system-to-system internal operations provide a final output to storage if training to data (display of data is optional) 106 and 111 of FIG. 12 and FIG. 14, or to storage and display if testing data is the LOIS. Translations outside of the LOIS, to the same initial input, are considered done by another system attachment of the same makeup or a makeup which is simpler in whole; that is, memory may not be necessary. Transfer of the data is done via data value-to-bit translations of the processed data. These data format changes can be a result of a specific sequence of firmware machine codes, higher level language application software converted to machine code for the processor, or hardware arrays of electronic components such a programmable logic arrays (PLA) which have a set of AND gate planes and OR gate planes that are combined to produce a specific output of instructions. The hardware can be chips used to implement a Boolean function, or process. Real complex LOIS systems used for designs that require methods of re-processing, iterations, or simply, multiple LOIS systems are called layers, or abstractions, which is a technique for designing very sophisticated computer systems.

Typical data sets for LOIS systems are comprised of data sets containing pixel intensities, where each intensity has metrics of axis identified pixel locations, and color intensity values where the axis identifiers can be of higher dimension. The term metric, is a standard of measurement to define changes in a data set that were a result of the physical natures of the device used to capture the data.

Memory of LOIS systems can be inside the processor (FIG. 8, or as given in 106 and 109 of FIG. 13), stored on some portable media or medium, or independent of the processor but on board the LOIS system. The access to the data is by datapaths (35). Memory may be volatile where information stored is lost when power is removed or non-volatile memory that is not subject to power loss such as a magnetic storage device.

Communications between the components and other systems is performed by way of the datapath bus 37 and 38 of FIG. 8 and as given in FIG. 13. Sequences of binary bits travel these paths to provide data and instructions to the LOIS. If data is not in the proper format the system can also provide that action to convert its input into the necessary sequence of bits readable by machine code.

Computer words are composed of bits allowing words to be represented as binary numbers. The LOIS takes advantage of this ability so that it may include input that is represented by numbers, arithmetic algorithms, and hardware that follows the algorithms in terms of instructions sets. The unit of hardware that works with bit words is the Arithmetic logic unit, or ALU. It operates by the Arithmetic-logical instructions to process the math common in the learning phase of LOIS.

Typical algorithms, in the context herein, are rule-based algorithms or black-boxed algorithms (107 in FIG. 13). Rule-based algorithms are machine coded processes such as decision trees, where the outcome is another process from a sequence of decisions that are recorded to or hardware. Black-box algorithms are algorithms whose outcome is hidden from the user, such as a Neural Network.

Hardware to software interface typically is a page table implementation, together with a program counter and the registers. If another LOIS system needs to use a processor, a state has to be saved (112 and 118 of FIG. 14). After restoring the state, a program can continue from where it left off. This saving of states allows the LOIS to save data in blocks. This allows the LOIS of this program to group processes in one location to be retrieved in one continuous read. For example, if a grouping of data needs to be held together as one definition of an object, regardless of length, then it can be done by saving a state. You may also append to an area of this nature because you have the saved state and know here it was place in the process sequence. Therefore, the process's address space, and hence all the data it can access in memory, is defined by its page table, which resides in memory. Rather than saving the entire page table, the firmware operating system simply loads the page table register to point to the page table of the process it wants to make active. An example, say one enclosure as described by FIG. 14, is a vector or matrix set of points defining a circle on an x,y-axis. The process would save the state, start writing the data to memory, continue a process, return, start saving summations of rows and columns of a x,y-axis data set, continue a process, return, then start saving statistics of the summations of rows and columns of a x,y-axis data set, so on. Now, if the state is saved, the table can be called and x,y-points, row and column summations, and statistics can be read as one sequence meaning that after that sequence is read, it can be defined as one data set with dynamic length. In the case of this system, the sequence of data is a manifold. It is important to now that the sequence can be another set of the same sequence of x-y-axis points, summations, and statistics meaning that any storage sequence can have any length as long as memory can be allocated for it. This means that a classifier can pull a sequence of any size necessary for learning algorithm needs or for purposes of classifying its data set stored, or its analyzed data and manipulating the data stored.

In spirit of the above, the FIGS. 1 through 19 are used to describe the process of the invention.

I claim:

1. A processing system conglomeration for phenomenon and phenomena repeatability tracking, comprising:

At least one metric code sequence structure having elements of data format types consistent with means for describing, uniquely, characteristics as functions and function elements of phenomenon and phenomena, determined by adaptive feedback tracking system conglomeration processes, for replacement of elements of original raw data with individual re-processed raw data elements translated into elements of at least one system readable single and grouped sets of phenomenon and phenomena metric code sequence descriptors stored at editable and appendable addresses in a memory structures not all of same element data type and size of said original raw data taken by said tracking system, means for assembling from at least one sample set of raw data, and at least one system conglomeration process iteration of said sample set, editable and portable and re-processable, system and portable format stored, phenomenon and phenomena metric code sequences of raw data element group formations of meaningful equivalent element formation substitutes of at least one system and at least one user input processed through said conglomeration, as occurring and repeatable in nature and natural sciences, as phenomenon and phenomena falling into a final classification category of at least one of: person, place, thing, experience, expression, idea and combinations of same categories, means for communications between stored phenomenon and phenomena code metric sequences and conglomerations of at least one of: interruptible and timing abled system conglomeration of phenomenon and phenomena code metric sequence assemblers and code sequence builders, adaptive phenomenon and phenomenon feedback components, system external conglomeration attachments, raw input data gathering devices, input data format translator assemblers as means to process raw data gathered into formats that are readable to phenomenon and phenomena metric code sequence assemblers, transceivers means for input and output display and edits of phenomenon and phenomena metric code sequence builders during and after process interruption, input and output devices and system attachments, storage locations, component conglomeration interruption controllers, and time controllers, and power supplies interruptible and time-controlled as means for selectively processing elements of phenomenon and phenomena metric code sequences, system self-test controllers, and micro-code processors and builders, means for input to said tracking system and data gather devices and means for sending and ending component interruptions to same tracking system and its attachments, means for output of end of processing, final output, of phenomenon and phenomena repeatability tracking system, means for editing phenomenon and phenomena during, after, and when system sensors and controllers decide by means for phenomenon and phenomena metric code sequences and user and system interrupts, means for processing at least one said tracking conglomeration iteration input of raw data and phenomenon and phenomena metric code sequences, means for interconnecting said listing of means for enhancements of final classification meanings to complete phenomenon and phenomena metric code sequences processed, means for interconnecting in a plurality of layers and in higher dimensions of at least one combination of said listing of means for the given phenomenon and phenomena tracking system.

2. The system of claim 1, wherein phenomenon and phenomenon code metric elements are designed by system designed contour descriptors of at least one open grouping of at least one element contained in at least one phenomenon and phenomenon metric code storage memory pointer location.

3. The system of claim 1, wherein phenomenon and phenomenon are designed by system designed contour descriptors of at least one closed grouping of at least one element contained in at least one phenomenon and phenomenon metric code storage memory pointer location.

4. The system of claim 1, wherein packaged system conglomeration of said phenomenon and phenomena repeatability tracking system is comprising of at least one of:

Phenomenon and phenomenon tracking systems entirely contained in at least one electronic conglomeration of components needed as means for processing and output of at least one phenomenon or phenomena metric code sequence, Phenomenon and phenomenon tracking systems entirely contained in combinations of microcode systems and electronic conglomeration combinations needed as means for processing and output of at least one phenomenon and phenomena code sequence, Phenomenon and phenomenon tracking systems entirely contained in combinations of parallel combined systems and electronic conglomeration combinations needed as means for processing and output of at least one phenomenon and phenomena code sequence, Phenomenon and phenomenon tracking systems entirely contained in combinations of series and parallel combined systems and electronic conglomeration combinations needed as means for processing and output of at least one phenomenon and phenomena code sequence.

5. The system of claim 4, wherein electronic conglomerations are replaced by at least one mechanical and at least one electronic combination of conglomerations.

6. The system of claim 4, or 5, wherein conglomerations are attachments to said systems of conglomerations forming a plurality of dimensional and at least one layered conglomerations.

7. The system of claim 1, wherein phenomenon and phenomena metric code sequences are editable assembled and interruptible system storage structures of at least one code line comprising: label, mean, variance, bound area, Gaussian Mixture Component descriptor set, and at least one appendable storage location for additional structures specific to means for identifying uniqueness of found phenomena and phenomenon described by a line of code in metric code sequence, and at least one expandable blank location as a means for storage of system and user decided appendages of other descriptors and functions and system outputs also pertinent to the uniqueness to particular phenomenon and phenomena described by said line of code and for means for code sequences describing to processer assemblers how processor got phenomenon so as to repeat process externally and independent of need to re-take and reprocess raw data.

8. The system of claim 7, wherein user editable and appendable and communications abled storage locations, of at least one unique line of metric code descriptors, of phenomenon and phenomena metric code sequence elements, sequenced as a line of code, of computer readable data structures of each element of said code, is comprised of at least one combination of at least one of:

The storage location formatted for means for storage of at least one phenomenon and phenomena descriptor input of a matrix of at least size row one and column one of at least one coordinate axis dimension, The storage location formatted for means for storage of at least one phenomenon and phenomena descriptor input of at least one numerical set structured result, The storage location formatted for means storage of at least one phenomenon and phenomena descriptor input of at least one character set structured result, The storage location formatted for means for storage of at least one function output set, of set structure format assembled to that format of system's communications microcode instruction sequence process, of at least one phenomenon and phenomena metric code sequence element, function analyzed, per said tracking system conglomeration process iteration, The storage location formatted for means for storage of at least one function output sequence set, of set structure format assembled to that format of system's communications microcode instruction sequence process, of at least one phenomenon and phenomena metric code sequence, function analyzed, per at least one said tracking system conglomeration process iteration, The storage location formatted for means for storage of at least one layer and at least one coordinate dimension of at least one sub-phenomenon phenomenon and phenomena metric code structure set of at least one sub-phenomena metric code structure element, The storage location formatted for means for storage of at least one biological hardware capture and communications abled assembler output, translated by said tracking system as means to make data usable, data set structure, The storage location formatted for means for storage of at least one graphic, said tracking system conglomeration communications abled hardware attached, capture, and communications abled, assembler translated by said tracking system as a means to make data usable, data set structure, The storage location formatted for means for storage of a hard copy printed capture, processed by at least one scanning of at least one framing and resending to system conglomeration communications abled assembler translator by said tracking system as a means to make data usable, of at least one capture, of at least one graphic captured, as a data set structure, The storage location formatted for means for storage of a system plotted frame and graphic capture, processed by at least one scanning of at least one framing of capture, and resending capture to system conglomeration communications abled assembler translator by said tracking system as a means to make data usable, of at least one frame capture, of at least one frame of graphic captured, as a data set structure, The storage location formatted for means for storage of a video sequence and video captured time-ranged frame of graphic of interest, processed by at least one scanning of frame and resending to system conglomeration communications abled assembler translator by said tracking system as a means to make data usable, of at least one frame capture, of at least one graphic captured, as a data set structure, The storage location formatted for means for storage of an audio sequence and audio captured of at least one time and at least one frequency ranged, frame, plotted as a graphic of interest, processed by at least one scanning of time and frequency, ranged, capture frame and resending to system conglomeration communications abled assembler translator by said tracking system as a means to make data usable, of at least one frame capture, of at least one graphic captured, as a data set structure, The storage location formatted for means for storage of said conglomeration system output displayed visually to a graphic, and assembler translated to at least one graphic data set structure, The storage location formatted for means for storage of system conglomeration's component control operational sequence sets, translated by operation assembler code builders, to operation and sequence sets of interruption code step representations, The storage location formatted for means for storage of said tracking system conglomeration's component output control and input control sequence sets, translated by operation assembler code builders, to operation and sequence sets of input and output sequence process code step representations, The storage location formatted for means for storage of said tracking system conglomeration's component output control and input control encryption and decryption sequence sets, translated by operation assembler code builders, to operation and sequence sets of input and output sequence process code step representations.

9. The system of claim 8, wherein elements of code in phenomenon and phenomena metric code sequences are properly formatted and structured and initialized as pre-processing, null value, editable place holders, by said tracking system conglomeration.

10. The system of claim 8, wherein said tracking system conglomerations are communicating as a means to finding, in static and dynamic designs of said tracking system conglomeration component layout structures, a final, raw data processed then assembled and disconnected said tracking system generated phenomenon metric code sequence, created upon completion of at least one communications process of at least one iteration of at least one conglomeration of said tracking system component set comprising combinations of at least one of:

at least one means for processing and structuring editable and system and user interruptible phenomenon and phenomena metric code sequences, at least one phenomenon microcode assembler means for at least one appendage to a storage container memory point of entry, of a metric code sequence structure, suitable for both system process and text file portable storage transfer to components in communications with system output ports, at least one phenomenon memory module as means for storage of raw data and at least one iteration and at least one layer of phenomenon and phenomena metric code sequences structured to be system processed and text file transported for means for phenomenon and phenomena data analysis on external and system communication connected ports, at least one general component communications memory module means for user and system interruptible component communications access to editable phenomenon and phenomena assembled metric code sequences, at least one microcode handler and microcode creator means to process and re-process generated phenomenon and phenomena metric code updates and appendages through at least one communications level and layer of adaptive feedback communications paths, of arranged said tracking system components, arrange for at least one iteration of corrective improvements to elements of phenomenon and phenomena metric code sequences, at least one means for communications between memory and processors and at least one time and power disable abled switchable data gather device, attached to system components and system attachments, all communications abled, both needing access and interruption control, of at least one layer and at least one dimension, of said data gather devices, in communications with memory for storage and tracking processing of principle raw data, at least one means for supplying power to all phenomena and phenomena detector and communications devices, and said system conglomerations, at least one input means for user to interrupt system, and components, in communications with same tracking system, for editing and restarting at any point in process, at least one code sequence element, of phenomenon and phenomena metric code sequences, at least one output means for user to interact with the system data input means so that visuals of output at interrupted points of processes, completed by at least one iteration of phenomenon and phenomena code sequence processing, of phenomenon and phenomena code sequences, have a point of user interaction and a point in storage locations to output text file to file transportation control and its output port, at least one data sensor device means to activate at least one system conglomeration data gathering device, at time intervals, and when thresholds of sensors are reached, at least one means to take system generated phenomenon and phenomena metric code output external from system as a means to graphic conversion transformation of system generated output, and process said graphic transformation output externally, and then re-introduce the transformation at interruption point for processing, and perform appendages to phenomenon and phenomena metric codes sequence structures as a result of transformation, and to internally edit and append phenomenon and phenomena in system at locations interrupted at user and system selected component locations, and system communicated with data gather device for means for re-processing phenomenon and phenomenon detection at interrupted phenomenon and phenomenon detection processing modified output as part of a means for at least one iteration of an adaptive feedback system, At least one timing device for means for conglomeration component timing control of processing raw data conglomerations from input gathering systems, and appendable phenomenon and phenomena metric sequence code assemblers and sequence code builders, and for output control and adaptive process timed sequencing, and for communications paths dynamic to timer control, and for communication switch control of input user control interrupters, At least one switching network means for taking timed raw data input, for processing system and user editable phenomenon and phenomena metric code sequences, and for system unit operations testing validations.

11. The system of claim 10, wherein the said tracking system communications abled data gather device is a bio-technology gathering device of output and memory received input and output means, interruptible, and of proper systems communications ability and of data translation processors and associated outputs, with means to assist as a system means to gather raw data for input to a system conglomeration's adaptive processor, and its assemblers, for means for processing and appending editable phenomenon and phenomena metric code sequences.

12. The system of claim 10, wherein the system communications abled data gather device is a scanning gathering device of hard output and screen display output and external display output of memory received input and output, interruptible, and of proper systems communications ability with data translation processors and associated outputs, to assist as a said tracking system means to gather raw data for input to a system conglomeration's adaptive processor and its assemblers for means for processing and appending editable phenomenon and phenomena metric code sequences.

13. The system of claim 10, wherein the system communicated data gather device is a portable data file communicated to the system conglomeration storage location as pre-formatted in a phenomenon and phenomena metric code sequence to be used and processed in its whole, part, and finality state by said tracking system and attached components.

14. The system of claim 10, wherein input data is supplied to system conglomeration as segmented memory of phenomenon and phenomena metric code elements of user controlled and timed inputs.

15. The system of claim 10, wherein input data is supplied to said tracking system conglomeration, as segmented memory of phenomenon and phenomena metric code sequence elements, in real-time from system conglomeration attachment communications ports, wherein said system has no user interruption of phenomenon and phenomena processing and no resulting metric code assembly and appendages determined by user interruption of said tracking system, unless system interruption is pre-programmed as a means for further processing accuracy of phenomenon and phenomena by feedback adaptive conglomeration communications active said tracking system components.

16. The system of claim 10, wherein interruption of phenomenon and phenomena processing assemblers, for means for further raw data input gathering and phenomenon and phenomena metric code structure assembly, is dependent on data gather devices activating sensors on said tracking system's data gathering devices.

17. The system of claim 16, wherein there is at least one sensor group, number in quantity of at least size one, that are external and in communications with system conglomeration input gather devices.

18. The system of claim 10, wherein an additional component is a conglomeration communications abled encryption assembler, translating at least one phenomenon and phenomena metric code element, of its phenomenon and phenomena metric code structure, into at least one encryption code sequence stored in an element storage location of same phenomenon and phenomena metric code structure, as a means for modulating further processed phenomenon and phenomena metric code sequences received as input by at least one said system conglomeration's data gather device and its transceiver controller device.

19. The system of claim 18, wherein an additional component is a conglomeration communications abled decryption assembler, translating at least one phenomenon and phenomena metric code element of encryption code sequence, of its structure, into at least one de-encryption code sequence, stored in an element storage location of same phenomenon and phenomena metric code structure, as a means for demodulating further processed phenomenon and phenomena metric code sequences received as input by at least one said system conglomeration's data gather device and its transceiver controller device for means for reproducing to at least approximate clarity the original phenomenon or phenomena metric code sequence encrypted by said encryption device.

20. The system of claim 1 or 18, wherein transceiver of said tracking system comprises at least one means of:
  transmit and receive means for raw data gathered by said tracking conglomeration system and its attachments,
  transmit and receive means for assembly and build of phenomenon and phenomena metric code sequences from processed raw data gathered by same said tracking conglomeration system, and its attachments, and processing and assembling phenomenon and phenomena metric code sequence structures for means for input to said tracking system conglomeration's storage and phenomenon and phenomena processing,
  transmit and receive video formats for means for assembly, format translation as means to make data readable by said tracking system, and build of phenomenon and phenomena metric code sequences from processed raw data gathered by transceiver, and said tracking system conglomeration, as at least one scanned video frame capture,
  transmit and receive audio formats for means for assembly, format translation as means to make data readable by said tracking system, and build of phenomenon and phenomena metric code sequences from processed raw data gathered by transceiver, and tracking system conglomeration, as at least one scanned audio frame capture,
  transmit and receive video time-ranged formats for means for assembly, format translation as means to make data readable by said tracking system, and build of phenomenon and phenomena metric code sequences from processed raw data gathered by transceiver, and tracking system conglomeration, as at least one scanned video time-ranged frame capture,
  transmit and receive audio time-ranged formats for means for assembly, format translation as means to make data readable by said tracking system, and build of phenomenon and phenomena metric code sequences from processed raw data gathered by transceiver, and tracking system conglomeration, as at least one scanned audio time-ranged frame capture,
  transmit and receive video frequency-ranged formats for means for assembly, format translation as means to make data readable by said tracking system, and build of phenomenon and phenomena metric code sequences from processed raw data gathered by transceiver, and tracking system conglomeration, as at least one scanned video frequency-ranged frame capture,
  transmit and receive audio frequency-ranged formats for means for assembly, format translation as means to make data readable by said tracking system, and build of phenomenon and phenomena metric code sequences from processed raw data gathered by transceiver, and tracking system conglomeration, as at least one scanned audio frequency-ranged frame capture,
  transmit and receive signal in frequency-domain segmented-ranged formats for means for assembly, format translation as means to make data readable by said tracking system, and build of phenomenon and phenomena metric code sequences from processed raw data gathered by transceiver, and tracking system conglomeration, as at least one scanned frequency-domain segmented-ranged frame capture as a means for translating from phenomenon and phenomena metric code sequences signal characteristics captured in said scan,
  transmit and receive signal in time-domain segmented-ranged formats for means for assembly, format translation as means to make data readable by said tracking system, and build of phenomenon and phenomena metric code sequences from processed raw data gathered by transceiver, and tracking system conglomeration, as at least one scanned time-domain segmented-ranged frame capture as a means for translating from phenomenon and phenomena metric code sequences signal characteristics captured in said scan,
  transmit and receive speech signals in frequency-domain Fourier Transformed in display segmented-ranged formats for means for assembly, format translation as means to make data readable by said tracking system, and build of phenomenon and phenomena metric code sequences from processed raw data gathered by transceiver, and tracking system conglomeration, as at least one scanned segmented-ranged frame capture as a means for translating from phenomenon and phenomena metric code sequences signal characteristics captured in said scan,
  transmit and receive voltage and current in display segmented-ranged formats, for means for assembly, format translation as means to make data readable by said tracking system, and build of phenomenon and phenomena metric code sequences from processed raw data gathered by transceiver, and tracking system conglomeration, as at least one scanned segmented-ranged frame capture as a means for translating from phenomenon and phenomena metric code sequences for voltage and current characteristics captured in said scan,
  transmit and receive function plots and photos in display segmented-ranged formats, for means for assembly, format translation as means to make data readable by said tracking system, and build of phenomenon and phenomena metric code sequences from processed raw data gathered by transceiver, and tracking system conglomeration, as at least one scanned segmented-ranged frame capture as a means for translating from phenomenon and phenomena metric code sequences for function and photo characteristics captured in said scan.

21. The system of claim 10, wherein speech is data captured by data gather devices and transceivers of said system tracking conglomeration, then speech signal processed into spectral representations by audio assemblers and processors, then scans and translations of displays of capture-frames spectral representations are sent to phenomenon and phenomena metric code sequence assemblers as means for comparison to past and present portable phenomenon and phenomena metric code sequences for speaker identity matching to past and present raw code converted also to phenomenon and phenomena metric code sequences for lookup table matched event and background noise eliminations and to determine and store phenomenon and phenomena metric code structure change errors.

22. The system of claim 10, wherein audio is data captured by data gather devices and transceivers of said system tracking conglomeration, then signal processed into original signal and spectral representations by audio assemblers and processors, then scans and translations of displays of capture-frames of original and spectral signal representations are sent to phenomenon and phenomena metric code sequence assemblers as means for comparison to past and present portable phenomenon and phenomena metric code sequences for original signal characteristics identity matching to past and present raw code converted also to phenomenon and phenomena metric code sequences for lookup table matched event and background noise eliminations and to determine and store phenomenon and phenomena metric code structure change errors.

23. The system of claim 10, wherein thermal data is captured by data gather devices and transceivers of said system tracking conglomeration, then processed into temperature and image and spectral representations by thermal data assemblers and processors, then scans and translations of displays of capture-frames of original and thermal package representations are sent to phenomenon and phenomena metric code sequence assemblers as means for comparison to past and present portable phenomenon and phenomena metric code sequences for original image and temperature characteristics identity matching to past and present raw code converted also to phenomenon and phenomena metric code sequences for lookup table matched event and background noise eliminations and to determine and store phenomenon and phenomena metric code structure change errors.

24. The system of claim 10, wherein voltage, current, power and energy as physics data is captured by data gather devices and transceivers of said system tracking conglomeration, then processed into physics specific representations by data assemblers and processors, then scans and translations of displays of capture-frames of original and electrical physics packaged representations are sent to phenomenon and phenomena metric code sequence assemblers as means for comparison to past and present portable phenomenon and phenomena metric code sequences for original physics package characteristics identity matching to past and present raw code converted also to phenomenon and phenomena metric code sequences for lookup table matched event and background noise eliminations and to determine and store phenomenon and phenomena metric code structure change errors, especially useful for a means for tracking changes in electromagnetic fields and infrared radiation and antenna gain pattern detection.

25. The system of claim 10, wherein sonar signal data is captured by data gather devices and transceivers of said system tracking conglomeration, then signal processed into original signal and spectral representations by assemblers and processors, then scans and translations of displays of capture-frames of original and spectral signal representations are sent to phenomenon and phenomena metric code sequence assemblers as means for comparison to past and present portable phenomenon and phenomena metric code sequences for original signal characteristics identity matching to past and present raw code converted also to phenomenon and phenomena metric code sequences for lookup table matched event and background noise eliminations and to determine and store phenomenon and phenomena metric code structure change errors.

26. The system of claim 10, wherein magnetic resonance imaging data is captured by data gather devices and transceivers of said system tracking conglomeration, then MRI data processed into original data and MRI signal and image representations by MRI assemblers and processors, then scans and translations of displays of capture-frames of original and MRI data representations are sent to phenomenon and phenomena metric code sequence assemblers as means for comparison to past and present portable phenomenon and phenomena metric code sequences for original MRI characteristics identity matching to past and present raw code converted also to phenomenon and phenomena metric code sequences for lookup table matched event and background noise eliminations and to determine and store phenomenon and phenomena metric code structure change errors.

27. The system of claim 21, 22, 23, 24, 25, or 26, wherein data captures are translated into encryptions by extraction of elements of the phenomenon and phenomena metric code sequence and modulating onto another data format.

28. The system of claim 1, wherein file compression formats are changed as means for manipulating static and dynamic data frame capture contents as means for providing new detections of phenomenon and phenomenon metric code sequences not otherwise detected in single sampled file formats and therefore providing the said tracking system adaptive feedback system error thresholds for adaptive feedback processing within said tracking system conglomeration to increase and decrease means for phenomenon focus needs and if necessary to enhance encryption and decryption possibilities when encryption and decryption is desired.

29. The system of claim 1, wherein digital file formats are changed as means for manipulating static and dynamic data frame capture contents as means for providing new detections of phenomenon and phenomenon metric code sequences not otherwise detected in single sampled file formats and therefore providing the said tracking system adaptive feedback system error thresholds for adaptive feedback processing within said tracking system conglomeration to increase and decrease means for phenomenon focus needs and if necessary to enhance encryption and decryption possibilities when encryption and decryption is desired.

30. The system of claim 1, 28, or 29, wherein static and dynamic photo data is captured by said phenomenon and phenomena metric code sequence repeatability tracking system conglomeration data gather devices and transceivers, then imaged processed into original image and spectral representations by system assemblers and processors, then scans and translations of displays of capture-frames of original and image representations are sent to phenomenon and phenomena metric code sequence assemblers and as means for comparison to past and present portable phenomenon and phenomena metric code sequences processed for original image characteristics identity and repeatability matching to past and present raw code converted images also processed to phenomenon and phenomena metric code sequences as a means for lookup table matching and background noise eliminations and to determine and metric store change errors.

* * * * *